(12) United States Patent
Ando et al.

(10) Patent No.: US 6,523,000 B1
(45) Date of Patent: Feb. 18, 2003

(54) TRANSLATION SUPPORTING APPARATUS AND METHOD AND COMPUTER-READABLE RECORDING MEDIUM, WHEREIN A TRANSLATION EXAMPLE USEFUL FOR THE TRANSLATION TASK IS SEARCHED OUT FROM WITHIN A TRANSLATION EXAMPLE DATABASE

(75) Inventors: Shinichi Ando, Tokyo (JP); Kiyoshi Yamabana, Tokyo (JP); Kenji Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,036

(22) Filed: Dec. 27, 1999

(30) Foreign Application Priority Data

Dec. 25, 1998 (JP) ............................................ 10-370357

(51) Int. Cl.⁷ ............................................... G06F 17/28
(52) U.S. Cl. ............................................... 704/2; 704/7
(58) Field of Search ........................... 704/2, 3, 4, 5–7, 704/9, 10; 707/530, 536, 3

(56) References Cited

U.S. PATENT DOCUMENTS

| 5,659,765 A | * | 8/1997 | Nii ................................. 704/2 |
| 5,963,940 A | * | 10/1999 | Liddy et al. ..................... 707/5 |
| 6,616,083 | * | 12/2000 | Franz et al. ..................... 704/4 |

FOREIGN PATENT DOCUMENTS

| JP | 6-318222 | 11/1994 | ............ G06F/15/38 |
| JP | 10-31676 | 2/1998 | ............ G06F/17/28 |
| JP | 10-63665 | 3/1998 | ............ G06F/15/38 |

* cited by examiner

Primary Examiner—Patrick N. Edouard
(74) Attorney, Agent, or Firm—Young & Thompson

(57) ABSTRACT

A translation supporting apparatus which searches out a translation example useful for a translation task from within a translation example database is disclosed. The translation example database stores character strings of a first language and translation results of a second language corresponding to the character strings in a unit of a document. A retrieval request inputting apparatus inputs a translation target sentence. A similarity retrieval apparatus determines, for each translation example, a similarity to the translation target sentence, a similarity to a translation example context which is another translation example having such a predetermined relationship that it is included in the same document and is present within one sentence before or after the translation example, a similarity to a retrieval request context which is another translation target character string having such a predetermined relationship that it is included in the same document as the translation target character string and is present within the range of one sentence before or after the translation target character string, and a similarity between the translation example context and the retrieval request context, and integrates the four similarities. A similar example outputting apparatus refers to the integrated similarities and outputs those translation examples similar to the translation target character string.

24 Claims, 20 Drawing Sheets

FIG.3

| 1 | Shorui o naoshimashita<br>(I have made the correction<br>of the document) | |

FIG.4

| DOCUMENT ID | SENTENCE ID | JAPANESE | ENGLISH |
|---|---|---|---|
| 1 | 1 | 例の書類ですが、いくつか間違いがありました | I found some errors on that document |
| 1 | 2 | 今晩中に直しておいて下さい | Please make a correction on it in this evening |
| 1 | 3 | 明日の朝、もう一度チェックします | I'll check up again tomorrow morning |
| 2 | 1 | 先のマシンの件ですが、壊れているようです | I found that machine was broken |
| 2 | 2 | 今晩中に直しておきます | I'll repair it in this evening |
| 3 | 1 | コートに穴を開けてしまいました | I have my coat with a hole |
| 3 | 2 | 今晩中に直しておいて下さいませんか | Could you mend it in this evening |

FIG.5

| DOCUMENT ID | SENTENCE ID | RETRIEVAL REQUEST SENTENCE ID | SIMILARITY BETWEEN ONE SENTENCE AND ONE SENTENCE | SIMILARITY WITH CONTEXT TAKEN INTO CONSIDERATION |
|---|---|---|---|---|
| 1 | 1 | 1 | 0.33 | |
| 1 | 2 | 1 | 0.5 | |
| 1 | 3 | 1 | 0 | |
| 2 | 1 | 1 | 0 | |
| 2 | 2 | 1 | 0.5 | |
| 3 | 1 | 1 | 0 | |
| 3 | 2 | 1 | 0.5 | |

FIG.6

| DOCUMENT ID | SENTENCE ID | RETRIEVAL REQUEST SENTENCE ID | SIMILARITY BETWEEN ONE SENTENCE AND ONE SENTENCE | SIMILARITY WITH CONTEXT TAKEN INTO CONSIDERATION |
|---|---|---|---|---|
| 1 | 1 | 1 | 0.33 | 0.68 |
| 1 | 2 | 1 | 0.5 | 0.73 |
| 1 | 3 | 1 | 0 | 0 |
| 2 | 1 | 1 | 0 | 0 |
| 2 | 2 | 1 | 0.5 | 0.5 |
| 3 | 1 | 1 | 0 | 0 |
| 3 | 2 | 1 | 0.5 | 0.5 |

FIG.7

| SIMILARITY | JAPANESE | ENGLISH |
|---|---|---|
| 0.73 | 今晩中に直しておいて下さい | Please make a correction on it in this evening |
| 0.68 | 例の書類ですが、いくつか間違いがありました | I found some errors on that document |
| 0.5 | 今晩中に直しておきます | I'll repair it in this evening |
| 0.5 | 今晩中に直しておいて下さいませんか | Could you mend it in this evening |

FIG.11

| 1 | 書類を受け取りました | I received the document. |
|---|---|---|
| 2 | Suguni naoshite okimasu (I'll make a correction immediately) | |

FIG.12

| DOCUMENT ID | SENTENCE ID | JAPANESE | ENGLISH |
|---|---|---|---|
| 1 | 1 | 今晩中にこの書類を直しておいて下さい | Please make a correction on this document in this evening |
| 1 | 2 | 明日の朝、もう一度チェックします | I'll check up again tomorrow morning |
| 2 | 1 | 先のマシンの件ですが、壊れているようです | I found that machine was broken |
| 2 | 2 | 今晩中に直しておきます | I'll repair it in this evening |
| 3 | 1 | コートに穴を開けてしまいました | I have my coat with a hole |
| 3 | 2 | 今晩中に直しておいて下さいませんか | Could you mend it in this evening |

FIG.13

| DOCUMENT ID | SENTENCE ID | RETRIEVAL REQUEST SENTENCE ID | SIMILARITY BETWEEN ONE SENTENCE AND ONE SENTENCE | SIMILARITY WITH CONTEXT TAKEN INTO CONSIDERATION |
|---|---|---|---|---|
| 1 | 1 | 1 | 0.4 | -- |
| 1 | 2 | 1 | 0 | -- |
| 2 | 1 | 1 | 0 | -- |
| 2 | 2 | 1 | 0 | -- |
| 3 | 1 | 1 | 0 | -- |
| 3 | 2 | 1 | 0 | -- |
| 1 | 1 | 2 | 0.4 | 0.68 |
| 1 | 2 | 2 | 0 | 0 |
| 2 | 1 | 2 | 0 | 0 |
| 2 | 2 | 2 | 0.5 | 0.5 |
| 3 | 1 | 2 | 0 | 0 |
| 3 | 2 | 2 | 0.5 | 0.5 |

FIG.14

| SIMILARITY | JAPANESE | ENGLISH |
|---|---|---|
| 0.68 | 今晩中にこの書類を直しておいて下さい | Please make a correction on this document in this evening |
| 0.5 | 今晩中に直しておきます | I'll repair it in this evening |
| 0.5 | 今晩中に直しておいて下さいませんか | Could you mend it in this evening |

FIG.18

| DOCUMENT ID | SENTENCE ID | RETRIEVAL REQUEST SENTENCE ID | SIMILARITY BETWEEN ONE SENTENCE AND ONE SENTENCE | SIMILARITY WITH CONTEXT TAKEN INTO CONSIDERATION |
|---|---|---|---|---|
| 1 | 1 | 1 | 0.33 | — |
| 1 | 2 | 1 | 0 | — |
| 1 | 3 | 1 | 0 | — |
| 2 | 1 | 1 | 0 | — |
| 2 | 2 | 1 | 0 | — |
| 3 | 1 | 1 | 0 | — |
| 3 | 2 | 1 | 0 | — |
| 1 | 1 | 2 | 0 | 0 |
| 1 | 2 | 2 | 0.5 | 0.73 |
| 1 | 3 | 2 | 0 | 0 |
| 2 | 1 | 2 | 0 | 0 |
| 2 | 2 | 2 | 0.5 | 0.5 |
| 3 | 1 | 2 | 0 | 0 |
| 3 | 2 | 2 | 0.5 | 0.5 |

FIG.19

| SIMILARITY | JAPANESE | ENGLISH |
|---|---|---|
| 0.73 | 今晩中に直しておいて下さい | Please make a correction on it in this evening |
| 0.5 | 今晩中に直しておきます | I'll repair it in this evening |
| 0.5 | 今晩中に直しておいて下さいませんか | Could you mend it in this evening |

TRANSLATION SUPPORTING APPARATUS AND METHOD AND COMPUTER-READABLE RECORDING MEDIUM, WHEREIN A TRANSLATION EXAMPLE USEFUL FOR THE TRANSLATION TASK IS SEARCHED OUT FROM WITHIN A TRANSLATION EXAMPLE DATABASE

BACKGROUND OF THE INVENTION

1. Field of the Invention

The present invention relates to a translation supporting apparatus which retrieves, from within a translation example database in which character strings of a first language and translation results of another language corresponding to the character strings are stored, a translation example similar to an input of a user and presents it to the user to support a translation task.

2. Description of the Related Art

From a point of view that a translation task is facilitated if a translation result in the past corresponding to a character string similar to a character string which a user intends to translate is obtained, a translation supporting apparatus has conventionally been proposed which retrieves an example similar to an input of a user from within a translation example database and presents the retrieved example to the user.

For example, an apparatus is proposed in Japanese Patent Laid-Open No. Hei 6-318222 wherein a keyword extracted from within an inputted sentence of a first language and a keyword of a second language obtained by translating the keyword of the first language using a word dictionary are both used to perform similarity retrieval (hereinafter referred to as first prior art). The apparatus is based on a technique of calculating a degree of similarity (the degree of similarity may be hereinafter referred to simply as similarity) with a coincidence degree in a unit of a word called keyword. However, since only a translation example translated literally can be retrieved only with a keyword of a first language, in order to minimize a miss of retrieval, also a translated word of a second language corresponding to the keyword of the first language is used for retrieval.

Another apparatus is disclosed in Japanese Patent Laid-Open No. 10-31676 wherein a synonym dictionary is used and a similarity between words is calculated taking not only a similarity of a character string but also a similarity in meaning into consideration (hereinafter referred to as second prior art). The apparatus performs retrieval including a synonym which is not retrieved only with a similarity of characters and also decreases a retrieval miss.

However, the apparatus of the first prior art and the second prior art both take only a similarity calculated between sentences into consideration and fail to retrieve a sufficiently similar sentence from within a document in which omission of words or anaphoric expressions such as pronouns are used frequently. It is often the case that, for example, although the same expression is used in a certain language, in another language, various expressions must be used properly depending upon the situation. However, where it is considered that omission of words is included frequently or anaphoric expressions such as pronouns are used in an actual writing, all of such situations are not necessarily included in one writing and a key representing a situation frequently appears in preceding and/or succeeding sentences. Nevertheless, the conventional apparatus have a drawback in that, since an example of a similar translation is selected only based on the similarity between one sentence and one sentence, a necessary translation example cannot be presented frequently.

It is to be noted that, although selection of a similar translation example is employed also in a translation method wherein a writing of an original language is divided into a plurality of portions and translation is performed separately for the portions of the writing as disclosed, for example, in Japanese Patent Laid-Open No. Hei 10-63665, also in this technical field, a translation example wherein a particular character string included in a sentence of an original language is included in one sentence is selected. Thus, a similar translation example is selected based only on the similarity between one sentence and one sentence similarly.

As described above, in the first and second prior art apparatus, a translation example is selected using only the similarity between one sentence and one sentence. Therefore, if a sentence with regard to which retrieval is required or individual translation examples include some omission of words or some anaphoric expressions, then they cannot retrieve or select a useful translation example.

SUMMARY OF THE INVENTION

It is an object of the present invention to provide a translation supporting apparatus and method by which a translation example similar to a character string of a translation target can be determined appropriately.

It is another object of the present invention to provide a translation supporting apparatus and method by which not only one sentence but also a context which is composed of sentences around each translation example are taken into consideration so that an appropriate translation example effective for a translation task can be retrieved and presented.

It is a further object of the present invention to provide a translation supporting apparatus and method by which not only one sentence but also a context which is composed of sentences around a sentence of a retrieval request are taken into consideration so that an appropriate translation example effective for a translation task can be retrieved and presented.

In order to attain the objects described above, according to an aspect of the present invention, there is provided a translation supporting apparatus for retrieving and outputting a translation example of a second language similar to a character string of a first language which is a translation target, comprising a translation example storage in which a plurality of character strings of the first language and a plurality of translation examples composed of results of translation of the second language from the character string are stored, a similarity determination for determining, for each of the translation examples, a similarity between the translation example and a retrieval request which is a translation target character string and a similarity between the retrieval request and a translation example context which is another translation example having a predetermined relationship to the translation example and integrating the similarities to determine an integrated similarity, a similarity storage for storing the integrated similarities determined by the similarity determination for the individual translation examples, and an output for referring to the integrated similarities stored in the similarity storage and outputting a translation example similar to the retrieval request.

The similarity determination may set, for each of the translation examples, a translation example which is another translation example which belongs to the same document as the translation example and whose distance from the translation example in the document is within a predetermined range as the translation example context. Further, the similarity determination determines, for each of the translation examples, the integrated similarity as a weighted sum of the similarity between the translation example and the retrieval request and the similarity between the translation example context and the retrieval request. Furthermore, the weight on the similarity between the translation example context and the retrieval request may be smaller than the weight on the similarity between the translation example and the retrieval request. In addition, the weight on the similarity between the translation example context and the retrieval request decreases as the distance between the translation example context and the translation example in the document increases.

According to another aspect of the present invention, there is provided a translation supporting apparatus, comprising a translation target storage apparatus in which a character string of a first language which is a translation target is stored, a translation example database in which character strings of the first language and translation examples of a second language corresponding to the character strings are stored for each document, retrieval request inputting means for accepting the character string of the first language stored in the translation target storage apparatus as a retrieval request, a similarity retriever for retrieving a translation example corresponding to a character string similar to the retrieval request inputted by the retrieval request input from within the translation example database, and a similar example output for outputting the similar example retrieved by the similarity retriever, the similarity retriever including a similarity calculation control for controlling the entire similarity calculation, a translation example reader for reading out the translation examples one by one from the translation example database, a similarity calculator for comparing the retrieval request inputted by the retrieval request input and the translation example read in by the translation example reader with each other to calculate a similarity, a similarity storage apparatus for storing, for each of combinations of the retrieval request inputted by the retrieval request input and the translation examples in the translation example database, the similarity calculated by the similarity calculator together with the combination, a translation example context extractor for extracting a translation example which has as predetermined relationship to a certain translation example in the translation example database as a translation example context of the certain translation example, and a similarity integrator for referring to the similarity stored in the similarity storage and integrating the similarities between the retrieval request and the translation examples and the similarities between the retrieval request and the translation example contexts to calculate the similarities to the translation examples.

With the translation supporting apparatus, since a similarity is calculated taking not only one sentence but also a context composed of a sentence around each translation example into consideration, even where the individual translation examples include ellipses or anaphoric expressions, an appropriate translation example useful to a translation task can be retrieved and presented preferentially.

According to a further aspect of the present invention, there is provided a translation supporting apparatus for retrieving and outputting a translation example of a second language similar to a character string of a first language which is a translation target, comprising a translation example storage in which a plurality of character strings of the first language and a plurality of translation examples composed of results of translation of the second language from the character string are stored, a similarity determination for determining, for each of the translation examples, a similarity between the translation example and a retrieval request which is a translation target character string and a similarity between the translation example and a retrieval request context which is another translation target character string having a predetermined relationship to the retrieval request and integrating the similarities to determine an integrated similarity, a similarity storage for storing the integrated similarities determined by the similarity determination for the individual translation examples, and an output for referring to the integrated similarities stored in the similarity storage and outputting a translation example similar to the retrieval request.

The similarity determination may set a translation target character string which is another translation target character string which belongs to the same document as the translation example and whose distance from the retrieval request in the document is within a predetermined range as the retrieval request context. Further, the similarity determination may determine, for each of the translation examples, the integrated similarity as a weighted sum of the similarity between the translation example and the retrieval request and the similarity between the translation example and the retrieval request context. Furthermore, the weight on the similarity between the translation example and the retrieval request context may be smaller than the weight on the similarity between the translation example and the retrieval request. In addition, the weight on the similarity between the translation example and the retrieval request context may decrease as the distance between the retrieval request context and the retrieval request in the document increases.

According to a still further aspect of the present invention, there is provided a translation supporting apparatus, comprising a translation target storage apparatus in which a character string of a first language which is a translation target is stored, a translation example database in which character strings of the first language and translation examples of a second language corresponding to the character strings are stored for each document a retrieval request input for accepting the character string of the first language stored in the translation target storage apparatus as a retrieval request a similarity retrieval for retrieving a translation example corresponding to a character string similar to the retrieval request inputted by the retrieval request input from within the translation example database, and a similar example output for outputting the similar example retrieved by the similarity retrieval, the similarity retrieval including similarity a calculation control for controlling the entire similarity calculation, a retrieval request context extractor for extracting, from within the translation target stored in the translation target storage apparatus, a character string of the first language which has a predetermined relationship to the retrieval request inputted by the retrieval request input as a retrieval request context, a translation example reader for reading out the translation examples one by one from the translation example database, a similarity calculator for comparing the retrieval request inputted by the retrieval request input and the retrieval request context extracted by the retrieval request context extractor with the translation example read in by the translation example reader to calculate similarities therebetween, a similarity storage apparatus for storing, for each of combinations of the retrieval request inputted by the retrieval request input and the retrieval request context extracted by the retrieval request context extractor with the translation examples in the translation example database, the similarity calculated by the similarity calculator together with the combination, and a similarity integrator for referring to the similarities stored in the similarity storage apparatus and integrating the similarities between the retrieval request and the translation examples and the similarities between the retrieval request contexts and the translation examples to calculate the similarities to the translation examples.

With the translation supporting apparatus, since a similarity is calculated taking not only one sentence but also a context composed of a sentence around a retrieval request sentence into consideration, even where a sentence used as a retrieval request includes some ellipsis or anaphoric expression, an appropriate translation example useful to a translation task can be retrieved and presented preferentially.

According to a yet further aspect of the present invention, there is provided a translation supporting apparatus for retrieving and outputting a translation example of a second language similar to a character string of a first language which is a translation target, comprising a translation example storage in which a plurality of character strings of the first language and a plurality of translation examples composed of results of translation of the second language from the character string are stored, a similarity determination for determining, for each of the translation examples, a similarity between the translation example and a retrieval request which is a translation target character string, a similarity between the retrieval request and a translation example context which is another translation example having a predetermined relationship to the translation example, a similarity between the translation example and a retrieval request context which is another translation target character string having a predetermined relationship to the retrieval request and a similarity between the translation example context and the retrieval request context and integrating the similarities to determine an integrated similarity, a similarity storage for storing the integrated similarities determined by the similarity determination for the individual translation examples, and an output for referring to the integrated similarities stored in the similarity storage and outputting a translation example similar to the retrieval request.

The similarity determination may set, for each of the translation examples, a translation example which is another translation example which belongs to the same document as the translation example and whose distance from the translation example in the document is within a predetermined range as the translation example context, and sets a translation target character string which is another translation target character string which belongs to the same document as the translation example and whose distance from the retrieval request in the document is within a predetermined range as the retrieval request context. Further, the similarity determination may determine, for each of the translation examples, the integrated similarity as a weighted sum of the similarity between the translation example and the retrieval request, the similarity between the translation example context and the retrieval request, the similarity between the translation example and the retrieval request context and the similarity between the translation example context and the retrieval request context. Furthermore, the weight on the similarity between the translation example context and the retrieval request, the weight on the similarity between the translation example and the retrieval request context and the weight on the similarity between the translation example context and the retrieval request context may be smaller than the weight on the similarity between the translation example land the retrieval request. In addition, the weight on the similarity between the translation example context and the retrieval request may decrease as the distance between the translation example context and the translation example in the document increases, the weight on the similarity between the translation example and the retrieval request context may decrease as the distance between the retrieval request context and the retrieval request in the document increases, and the weight on the similarity between the translation example context and the retrieval request context may decrease as the distance between the translation example context and the translation example in the document increases and decrease as the weight on the similarity between the retrieval request context and the retrieval request in the document increases.

According to a yet further aspect of the present invention, there is provided a translation supporting apparatus, comprising a translation target storage apparatus in which a character string of a first language which is a translation target is stored, a translation example database in which character strings of the first language and translation examples of a second language corresponding to the character strings are stored for each document, a retrieval request input for accepting the character string of the first language stored in the translation target storage apparatus as a retrieval request, a similarity retrieval for retrieving a translation example corresponding to a character string similar to the retrieval request inputted by the retrieval request input from within the translation example database, and similar example output for outputting the similar example retrieved by the similarity retrieval, the similarity retrieval including a similarity calculation control for controlling the entire similarity calculation, a retrieval request context extractor for extracting, from within the translation target stored in the translation target storage apparatus, a character string of the first language which has a predetermined relationship to the retrieval request inputted by the retrieval request input as a retrieval request context, a translation example reader for reading out the translation examples one by one from the translation example database, a similarity calculator for comparing the retrieval request inputted by the retrieval request input and the retrieval request context extracted by the retrieval request context extractor with the translation example read in by the translation example reader to calculate similarities therebetween, a similarity storage apparatus for storing, for each of combinations of the retrieval request inputted by the retrieval request input and the retrieval request context extracted by the retrieval request context extractor with the translation examples in the translation example database, the similarity calculated by the similarity calculator together with the combination, a translation example context extractor for extracting a translation example which has a predetermined relationship to a certain translation example in the translation example database as a translation example context of the certain translation example, and a similarity integrator for referring to the similarities stored in the similarity storage and integrating the similarities between the retrieval request and the translation examples, the similarities between the retrieval request and the translation example contexts, the similarities between the retrieval request context and the translation examples and the similarities between the retrieval request context and the translation example contexts to calculate the similarities to the translation examples.

With the translation supporting apparatus, since a similarity is calculated taking not only one sentence but also a context composed of a sentence around each translation example and a context composed of a sentence around a retrieval request sentence into consideration, even where a sentence used as a retrieval request and the individual translation examples include ellipses or anaphoric expressions, an appropriate translation example useful to a translation task can be retrieved and presented preferentially.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 3 is a diagrammatic view illustrating an example of a translation target stored in a translation target storage apparatus shown in FIG. 1;

FIG. 4 is a diagrammatic view illustrating an example of contents of a translation example database shown in FIG. 1;

FIG. 5 is a diagrammatic view illustrating an example of data stored in a similarity storage apparatus shown in FIG. 1;

FIG. 6 is a similar view but illustrating an example of data stored in the similarity storage apparatus shown in FIG. 1 after similarities are re-calculated;

FIG. 7 is a diagrammatic view illustrating an example of translation outputs which are similar to a retrieval request and outputted in accordance with the magnitudes of integrated similarities from the translation supporting apparatus of FIG. 1;

FIG. 11 is a diagrammatic view illustrating an example of a translation target stored in a translation target storage apparatus shown in FIG. 9;

FIG. 12 is a diagrammatic view illustrating an example of contents of a translation example database shown in FIG. 9;

FIG. 13 is a diagrammatic view illustrating an example of data stored in a similarity storage apparatus shown in FIG. 9;

FIG. 14 is a diagrammatic view illustrating an example of translation outputs which are similar to a retrieval request and outputted in accordance with the magnitudes of integrated similarities from the translation supporting apparatus of FIG. 9;

FIG. 18 is a diagrammatic view illustrating an example of data stored in a similarity storage apparatus shown in FIG. 16;

FIG. 19 is a diagrammatic view illustrating an example of translation outputs which are similar to a retrieval request and outputted in accordance with the magnitudes of integrated similarities from the translation supporting apparatus of FIG. 16.

DESCRIPTION OF THE PREFERRED EMBODIMENTS

Figure 1:
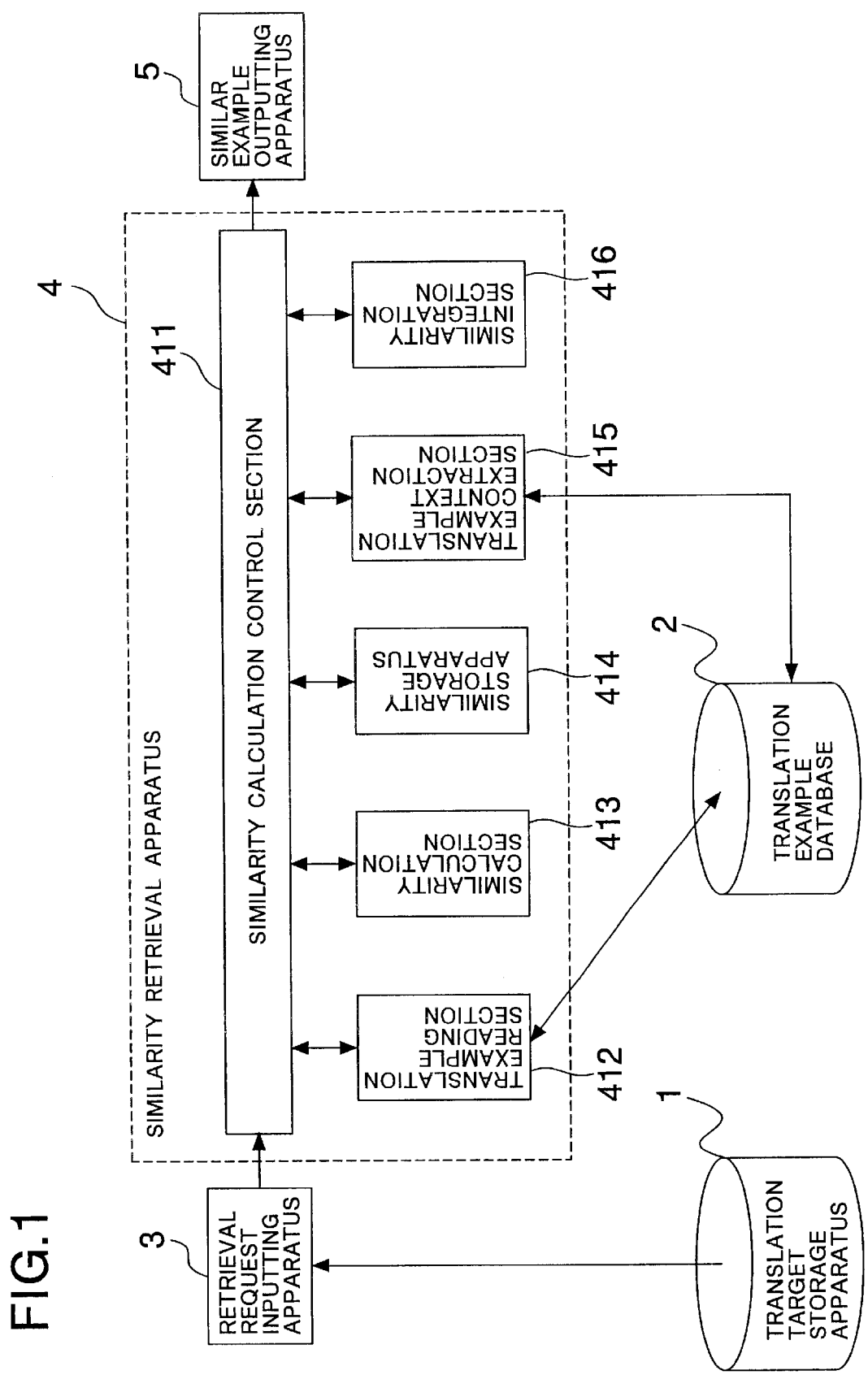
FIG. 1 is a block diagram showing a translation supporting apparatus to which the present invention is applied.

FIG. 1 shows a translation supporting apparatus to which the present invention is applied. The translation supporting apparatus takes a context composed of sentences around each translation example into consideration to determine a translation example similar to a character string of a translation target.

Referring to FIG. 1, the translation supporting apparatus shown includes a translation target storage apparatus 1 in which a character string of a first language which makes a translation target is stored, a translation example database 2 in which character strings of the first language and translation examples of a second language corresponding to the character strings of the first language are stored for each document, a retrieval request inputting apparatus 3 for accepting the character string of the first language stored in the translation target storage apparatus 1 as a retrieval request, a similarity retrieval apparatus 4 for retrieving translation examples for a character string similar to the retrieval request inputted by the retrieval request inputting apparatus 3 from within the translation example database 2, and a similar example outputting apparatus 5 for outputting similar examples retrieved by the similarity retrieval apparatus 4 to an outputting apparatus such as a display unit or a printer.

The similarity retrieval apparatus 4 includes a similarity calculation control section 411 for controlling entire similarity calculation, a translation example reading section 412 for reading out the translation examples one by one from the translation example database 2, a similarity calculation section 413 for comparing the retrieval request inputted by the retrieval request inputting apparatus 3 with a translation example read in by the translation example reading section 412 to calculate a similarity between them, a similarity storage apparatus 414 for storing, for a combination of the retrieval request inputted by the retrieval request inputting apparatus 3 and each of the translation examples in the translation example database 2, the similarity calculated by the similarity calculation section 413 together with the combination, a translation example context extraction section 415 for extracting a translation example (B) which has a predetermined relationship to a certain translation example (A) in the translation example database 2 as a translation example context of the translation example (A), and a similarity integration section 416 for referring to the similarities stored in the similarity storage apparatus 414 and integrating the similarities between the retrieval request and the translation examples and the similarities between the retrieval request and the translation example contexts to calculate the similarities of the individual translation examples.

Subsequently, operation of the translation supporting apparatus is described with reference to the block diagram of FIG. 1 and the flow chart of FIG. 2.

The translation target storage apparatus 1 has stored therein a character string which is described in a first language and makes a translation target of a user. Here, if a sentence translated already is available, the translation result of the sentence may be stored together, and the stored character string may be edited or displayed using an external editing apparatus.

The translation example database 2 has stored therein translation examples which include character strings of a first language translated in the past and character strings of a second language which are parallel translations of the character strings of the first language in a corresponding relationship to each other. Here, each of the translation examples is stored together with information of a unit such as a document, a paragraph or a word, the position at which the unit appears in an original writing and so forth.

The retrieval request inputting apparatus 3 accepts the character stored in the translation target storage apparatus 1 as a retrieval request from the user. This can be implemented, for example, by means of a keyboard, or alternatively, a character string or the like of a range selected by an external editing apparatus may be accepted as an input.

The similarity retrieval apparatus 4 accepts the retrieval request from the retrieval request inputting apparatus 3, executes similarity calculation under the control of the similarity calculation control section 411 and outputs translation examples similar to the retrieval request.

Figure 2:
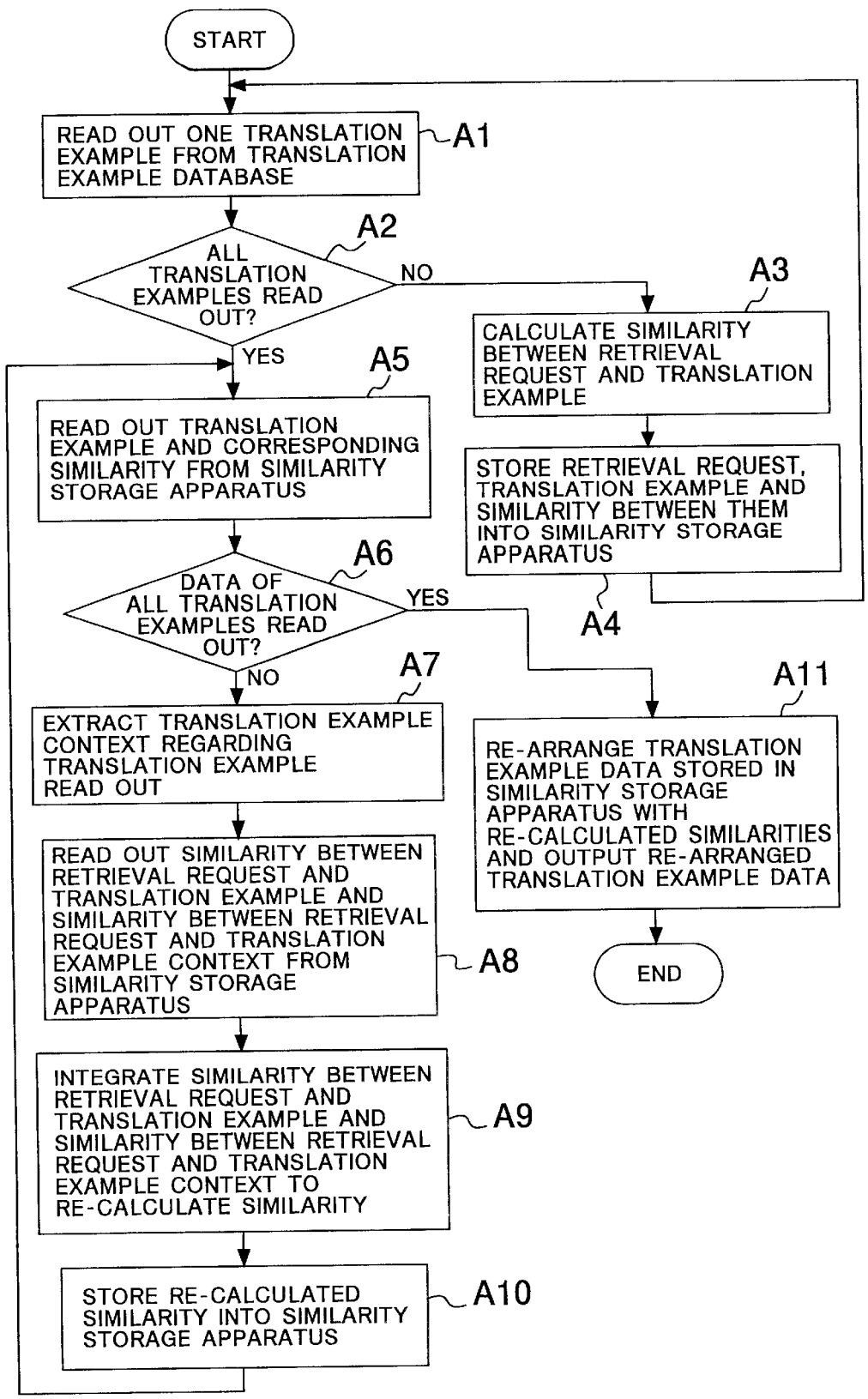
FIG. 2 is a flow chart illustrating operation of the translation supporting apparatus of FIG. 1.

The similarity calculation control section 411 first calls the translation example reading section 412 so that it reads in the translation examples one by one from the translation example database 2 (step A1 of FIG. 2). The similarity calculation control section 411 checks whether or not a translation example has been read in successfully (step A2 of FIG. 2). If a translation example has been read in successfully, then the similarity calculation control section 411 sends the retrieval request and the translation example read in by the translation example reading section 412 to the similarity calculation section 413. Consequently, the similarity calculation section 413 calculates the similarity between them (step A3).

Here, the similarity can be calculated, for example, by analyzing morphemes of both of the retrieval request and the translation example-and counting the number of independent words common to the two. This is a method wherein only word outer layer character strings of a first language are compared with each other to calculate a similarity. However, a calculation expression which takes a similarity in a second language obtained by utilization of a translation dictionary or a similarity in significance obtained by utilization of a synonym dictionary into consideration may be used alternatively.

Then, the similarity calculation control section 411 stores the similarity obtained in this manner into the similarity storage apparatus 414 together with the retrieval request and the translation example which have been objects of the calculation (step A4 of FIG. 2). Similar processing is repeated so that the similarity calculation control section 411 calculates similarities to all of the translation examples in the translation example database 2 and stores results of the calculation into the similarity storage apparatus 414.

Thereafter, the similarity calculation control section 411 further takes contexts into consideration to re-calculate the similarities with regard to the individual translation examples. More particularly, the similarity calculation control section 411 first reads out a translation example which is to be used an object of calculation and a similarity of the translation example from the similarity storage apparatus 414 (step A5 of FIG. 2). Then, the similarity calculation control section 411 discriminates whether or not a translation example and a similarity of the translation example have been read out successfully (step A6 of FIG. 2). If a translation example and a similarity of the translation example have been read out successfully, then the similarity calculation control section 411 sends the translation example to the translation example context extraction section 415. Consequently, the translation example context extraction section 415 extracts a translation example which has a predetermined relationship to the translation example in the translation example database 2 as a translation example context (step A7 of FIG. 2).

Here, the translation example context can be defined, for example, as an example which appears within the range of one sentence before or after it in the same document as that of the target translation example. Here, as the definition of the translation example context, a definition wherein the range before or after the example is more than one sentence, another definition which uses the number of words, a further definition wherein the range before or after the example is within the same paragraph or the same document or the like may be used alternatively.

Thereafter, the similarity calculation control section 411 reads out the similarities between the retrieval request and the translation examples and the similarities between the retrieval request and the translation example contexts from the similarity storage apparatus 414 (step A8 of FIG. 2) and sends the similarities to the similarity integration section 416. Consequently, the similarity integration section 416 integrates the similarities to re-calculate similarities (step A9 of FIG. 2).

Re-calculation of a similarity of a certain translation example can be defined, for example, as a weighted sum of a similarity between a retrieval request and the translation example and a similarity between the retrieval request and a translation example context. Here, for the weight on the similarity between the retrieval request and the translation example context, a value is used which is lower than the value of the weight on the similarity between the retrieval request and the translation example. The value of the weight, however, may be a constant, or otherwise, a function may be used which decreases in proportion to the distance from the translation example.

The similarities integrated by the similarity integration section 416 are stored into the similarity storage apparatus 414 (step A10 of FIG. 2). The similarity calculation control section 411 repeats similar processing to calculate context-inclusive similarities for all of the translation examples and stores the resulting similarities into the similarity storage apparatus 414. The similarity calculation control section 411 further refers to the context-inclusive similarities stored in the similarity storage apparatus 414 and outputs those translation examples similar to the retrieval text in accordance with the magnitudes of the similarities (step A11 of FIG. 2).

Now, operation of the translation supporting apparatus of FIG. 1 is described more particularly with reference to FIGS. 3 to 7. In the following description, the first language is English and the second language is Japanese. However, the spirit or scope of the present invention is not limited to this, and the present invention can be applied to any two languages.

FIG. 3 illustrates an example of the translation target stored in the translation target storage apparatus 1 and particularly represents that a sentence "書類を直しました" ("Shorui o naoshimashita") (I have made the correction of the document) is stored as a character string which is to be used as a target of a translation task of a user. It can be seen further from FIG. 3 that the sentence ID of the sentence is 1.

FIG. 4 illustrates contents of the translation example database 2. Referring to FIG. 4, each translation example is stored together with a document ID representative of a document and a sentence ID representative of a position of the sentence in the document. It can be seen from FIG. 4 that, for example, a sentence "今晩中に 直しておいて下さい" ("Konbanju ni naoshite oite kudasai") (Please make a correction on it in the evening) is stored as the second sentence of a document 1, and the next sentence is a sentence "明日の朝、もう一度チェックします" ("Asu no asa, mo ichido chekku shimasu") (I'll check up again tomorrow morning).

Thus, an operation of the translation supporting apparatus particularly where a similar example is retrieved from within the translation example database of FIG. 4 when the sentence ("Shorui o naoshimashita") stored in the translation target storage apparatus 1 of FIG. 3 is inputted as a retrieval request is described below.

The similarity calculation control section 411 first calls the translation example reading section 412 so that it reads in the translation examples one by one from the translation example database 2. Here, it is assumed that a sentence "例の書類 ですが、いくつか 間違いがありました" ("Rei no shorui desu ga, ikutsuka machigai ga arimashita") (I found some errors in that document") illustrated in FIG. 4 is read in first. Then, the similarity calculation control section 411 sends the retrieval request and the translation example thus read in to the similarity calculation section 413 so that the similarity between them is calculated by the similarity calculation section 413.

The similarity here can be calculated, for example, using independent words included in both of the retrieval request and the translation example and using such a calculation expression as "2×(number of independent words common to retrieval request and translation example)/{(number of independent words in retrieval request)+(number of independent words in translation example)}. For example, the retrieval request "Shorui o naoshimashita" includes two independent words of "書類" ("shorui") and "直す" ("naosu"), and the translation example "Rei no shorui desu ga, ikutsuka machigai gaarimashita" includes four independent words of "例" ("rei"), "書類" ("shorui"), "間違い" ("machigai") and "ある" ("aru"). Here, since the single word "書類" ("shorui") is an independent word common to the retrieval request and the translation example, the similarity can be calculated as 2×1/(2+4)=0.33. The similarity calculation control section 411 repeats similar processing to calculate similarities for all of the translation examples in the translation example database 2, and stores the resulting similarities into the similarity storage apparatus 414.

FIG. 5 illustrates an example of data stored in the similarity storage apparatus 414. It can be seen from FIG. 5 that each of the translation examples is managed with its document ID and sentence ID, and the similarity between each translation example and the retrieval request calculated by the similarity calculation section 413 is stored Thereafter, the similarity calculation control section 411 re-calculates the similarity of each translation example further taking a context into consideration. More particularly, the similarity calculation control section 411 sends a translation example which is to be used as an object of calculation to the translation example context extraction section 415 so that a translation example which has a predetermined relationship to the translation example of the calculation object in the translation example database 2 is extracted as a translation example context. Here, if the translation example context is defined, for example, as an example which appears within one sentence before or after the target translation example in the same document as that of the target translation example, then for the translation example "Rei no shorui desu ga, ikutsuka machigai ga arimashita", the translation example "Konbanju ni naoshite oite kudasai" which appears immediately after the translation example is obtained as a translation example document.

Then, the similarity calculation control section 411 reads out the similarity between the retrieval request and a translation example and the similarity between the retrieval request and a translation example context from the similarity storage apparatus 414 and sends the thus read out similarities to the similarity integration section 416 so that the similarities may be integrated to re-calculate the similarity by the similarity integration section 416. Re-calculation of a similarity to a certain translation example can be defined, for example, by the following calculation expression:
1) when the similarity between the retrieval request and the translation example is 0,
   0
2) in any other case than 1) above, (similarity between retrieval request and translation example)+
0.7×(similarity between retrieval request and translation example context)

Where the calculation expression given above is employed, the context-inclusive similarity to the translation example "Rei no shorui desu ga, ikutsuka machigai ga arimashita" is calculated as 0.33+0.7×0.5=0.68. The thus integrated similarity is stored back into the similarity storage apparatus 414.

The similarity calculation control section 411 repeats similar processing to calculate context-inclusive similarities of all of the translation examples and stores the resulting similarities into the similarity storage apparatus 414. FIG. 6 illustrates an example of data stored in the similarity storage apparatus 414 after the re-calculation of the similarities is performed.

Further, the similarity calculation control section 411 refers to the context-inclusive similarities stored in the similarity storage apparatus 414 and outputs those translation examples similar to the retrieval request in accordance with the magnitudes of the values of them. An example of the output is illustrated in FIG. 7.

It can be seen from FIG. 6 that, with regard to the similarity between one sentence and one sentence, three translation examples have the equal value of 0.5, and consequently, an appropriate translation example cannot be selected. However, from FIG. 7, it can be seen that, for the retrieval request of "Shorui o naoshimashita", the translation example of "Konbanju ni naoshite oite kudasai"—"Please make a correction on it in this evening" in which the word "直す" ("naosu") is translated appropriately with the meaning of "(誤りなどを)修正する" ("(ayamari nado o) syuseisuru)") (make a correction (of an error or the like)) is outputted first.

Figure 8:
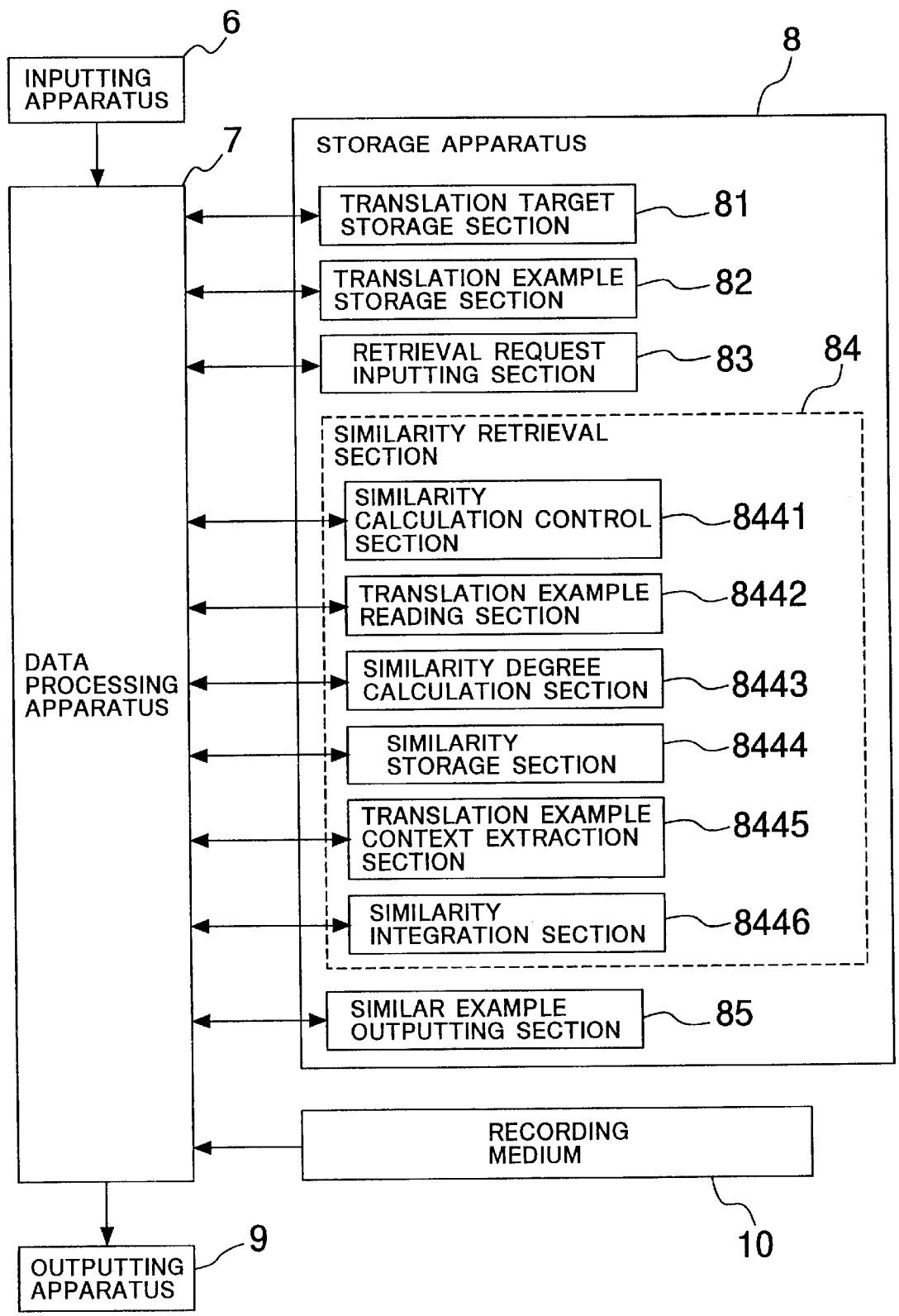
FIG. 8 is a block diagram of another translation supporting apparatus to which the first invention is applied.

FIG. 8 is a block diagram of another translation supporting apparatus to which the present invention is applied. Referring to FIG. 8, the translation supporting apparatus shown includes an inputting apparatus 6, a data processing apparatus 7, a storage apparatus 8, an outputting apparatus 9 and a recording medium 10 on which a translation supporting program is recorded. The data processing apparatus 7 is formed from, for example, a computer, and a translation supporting program which can be read and executed by the data processing apparatus 7 is recorded on the recording medium 10. The recording medium 10 may be a magnetic disc, a magnetic tape, an optical disc, a semiconductor memory or any other recording medium which can be read by a computer or the like.

The translation supporting program is read into the data processing apparatus 7 from the recording medium 10, and, when necessary, it is partly placed into the storage apparatus 8 and used to control operation of the data processing apparatus 7 so that such storage sections as a translation target storage section 81, a translation example storage section 82 and a similarity storage section 8444 of a similarity retrieval section 84 are implemented and such functioning sections as a retrieval request inputting section 83, a similar example outputting section 85, and a similarity calculation control section 8441, a translation example reading section 8442, a similarity calculation section 8443, a translation example context extraction section 8445 and a similarity integration section 8446 of the similarity retrieval section 84 are implemented on the computer. Here, as a relationship to the translation supporting apparatus described hereinabove with reference to FIG. 1, the translation target storage section 81 corresponds to the translation target storage apparatus 1; the translation example storage section 82 to the translation example database 2; the retrieval request inputting section 83 to the retrieval request inputting apparatus 3; the components of the similarity retrieval section 84 correspond to the components of the similarity retrieval apparatus 4; and the similar example outputting section 85 corresponds to the similar example outputting apparatus 5. The translation supporting apparatus of the present embodiment is characterized in that the data processing apparatus 7 operates under the control of the translation supporting program and has basic functions same as those of the translation supporting apparatus of FIG. 1. In particular, the data processing apparatus 7 executes the following processing under the control of the translation supporting program.

In response to an input from the inputting apparatus 6, the retrieval request inputting section 83 reads out a character string which is to be used as a retrieval request from the translation target storage section 81 and starts up the similarity calculation control section 8441 to execute similarity retrieval processing.

The similarity calculation control section 8441 accepts the retrieval request and starts up the translation example reading section 8442 first. The translation example reading section 8442 reads out translation examples one by one from the translation example storage section 82 and returns them to the similarity calculation control section 8441.

When the similarity calculation control section 8441 receives a translation example from the translation example reading section 8442, it starts up the similarity calculation section 8443 and delivers the retrieval request and the received translation example to the similarity calculation section 8443. The similarity calculation section 8443 receives the retrieval request and the translation example, calculates the similarity between them and returns the calculation result of the similarity to the similarity calculation control section 8441.

The similarity calculation control section 8441 receives the calculation result of the similarity from the similarity calculation section 8443 and stores the retrieval request and the translation example which has been the object of the calculation in a coordinated relationship into the similarity storage section 8444. Thereafter, the similarity calculation control section 8441 repeats, for all of the translation examples stored in the translation example storage section 82, calculation of the similarity and storage of the calculated similarity into the similarity storage section 8444.

After the similarity calculation for all of the translation examples stored in the translation example storage section 82 is completed, the similarity calculation control section 8441 reads in a translation example which is to be used as an object of re-calculation and a corresponding similarity from the similarity storage section 8444, and starts up the translation example context extraction section 8445 and delivers the read in translation example to the translation example context extraction section 8445. The translation example context extraction section 8445 receives the translation example, extracts a translation example which has a predetermined relationship to the translation example in the translation example storage section 82 as a translation example context of the translation example and returns the translation example context to the similarity calculation control section 8441.

The similarity calculation control section 8441 receives the translation example context and reads in the similarity between the retrieval request and the translation example context from the similarity storage section 8444. Then, the similarity calculation control section 8441 starts up the similarity integration section 8446 and sends the similarity between the retrieval request and the translation example context received from the similarity storage section 8444 to the similarity integration section 8446 together with the similarity between the retrieval request and the translation example which makes an object of re-calculation. The similarity integration section 8446 integrates the received similarities to re-calculate the similarity between the retrieval request and the translation example and returns a result of the similarity re-calculation to the similarity calculation control section 8441.

The similarity calculation control section 8441 receives the re-calculation result of the similarity from the similarity integration section 8446 and stores it into the similarity storage section 8444. Thereafter, the similarity calculation control section 8441 repeats, for all of the translation examples stored in the similarity storage section 8444, the processing of re-calculating the similarity and storing a result of the re-calculation into the similarity storage section 8444.

After the re-calculation of-the similarity for all of the translation examples stored in the similarity storage section 8444 is completed, the similarity calculation control section 8441 starts up the similar example outputting section 85. The similar example outputting section 85 orders the translation examples stored in the similarity storage section 8444 based on the similarities of the results of the re-calculation and outputs them in the order to the outputting apparatus 9.

Figure 9:
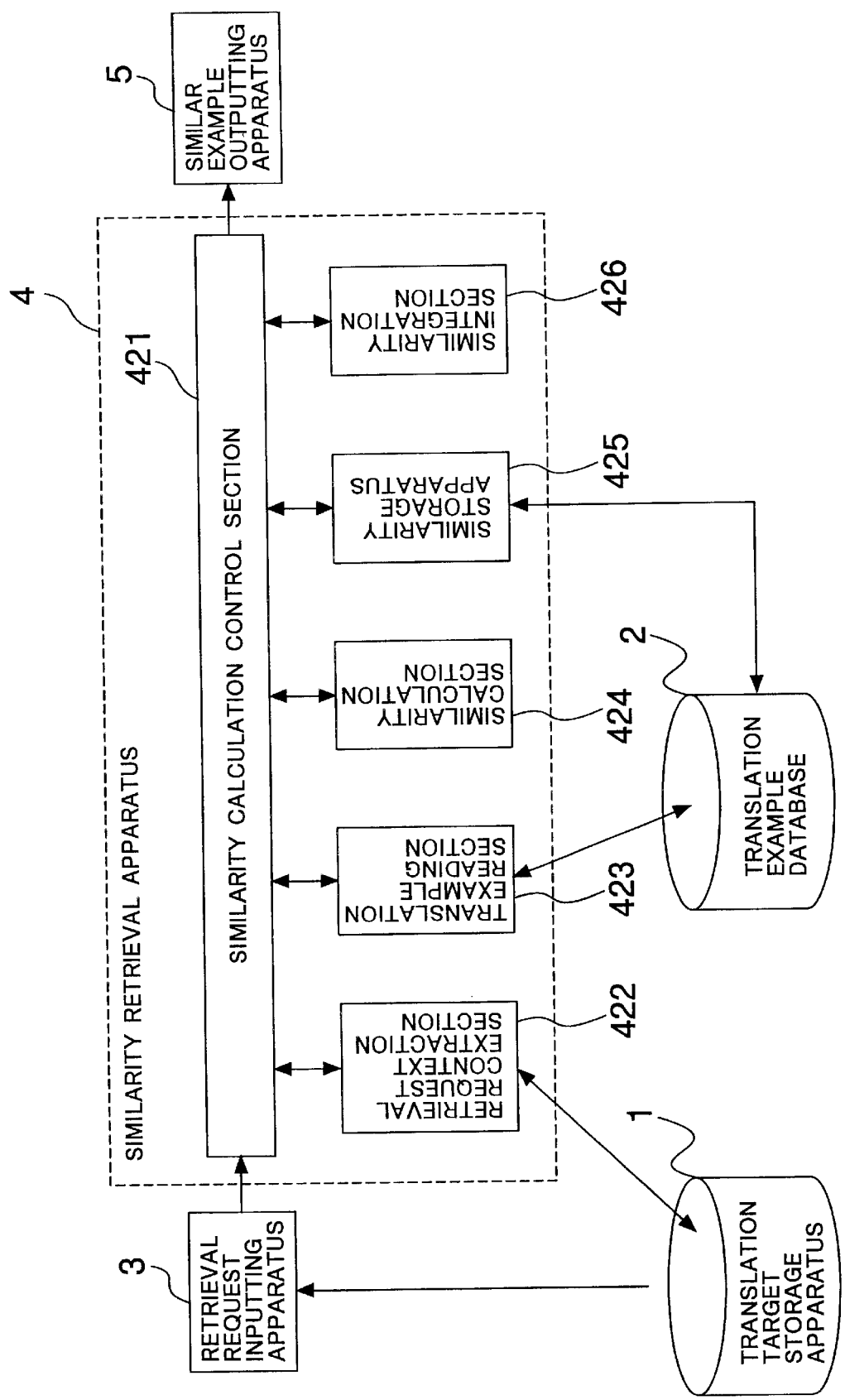
FIG. 9 is a block diagram of a further translation supporting apparatus to which the present invention is applied.

FIG. 9 shows a further translation supporting apparatus to which the present invention is applied. The present translation supporting apparatus takes a context composed of a sentence around a character string which makes a translation target into consideration to determine a translation example similar to the character string.

Referring to FIG. 9, the translation supporting apparatus shown is a modification to but is different from the translation supporting apparatus described hereinabove with reference to FIG. 1 only in the internal construction of the similarity retrieval apparatus 4. In particular, the similarity retrieval apparatus 4 of the present translation supporting apparatus includes a similarity calculation control section 421 for controlling entire similarity calculation, a retrieval request context extraction section 422 for extracting a character string of a first language which has a predetermined relationship to a retrieval request inputted from the retrieval request inputting apparatus 3 as a retrieval request context from within a translation target stored in the translation target storage apparatus 1, a translation example reading section 423 for reading out translation examples one by one from the translation example database 2, a similarity calculation section 424 for comparing the retrieval request inputted from the retrieval request inputting apparatus 3 and the retrieval request context extracted by the retrieval request context extraction section 422 with one translation example read in by the translation example reading section 423 to calculate similarities between them, a similarity storage apparatus 425 for storing the similarities calculated by the similarity calculation section 424 for combinations of the retrieval request inputted from the retrieval request inputting apparatus 3 and the retrieval request context extracted by the retrieval request context extraction section 422 with the individual translation examples stored in the translation example database 2 together with the combinations, and a similarity integration section 426 for referring the similarities stored in the similarity storage apparatus 425 and integrating the similarities between the retrieval request and the translation examples and the similarities between the retrieval request context and the translation examples to calculate the similarities of the individual translation examples.

Now, operation of the translation supporting apparatus of FIG. 9 is described with reference to the block diagram of FIG. 9 and the flow chart of FIG. 10.

If a retrieval request is received, then the similarity retrieval apparatus 4 executes similarity calculation under the control of the similarity calculation control section 421 and outputs a translation example similar to the retrieval request.

Figure 10:
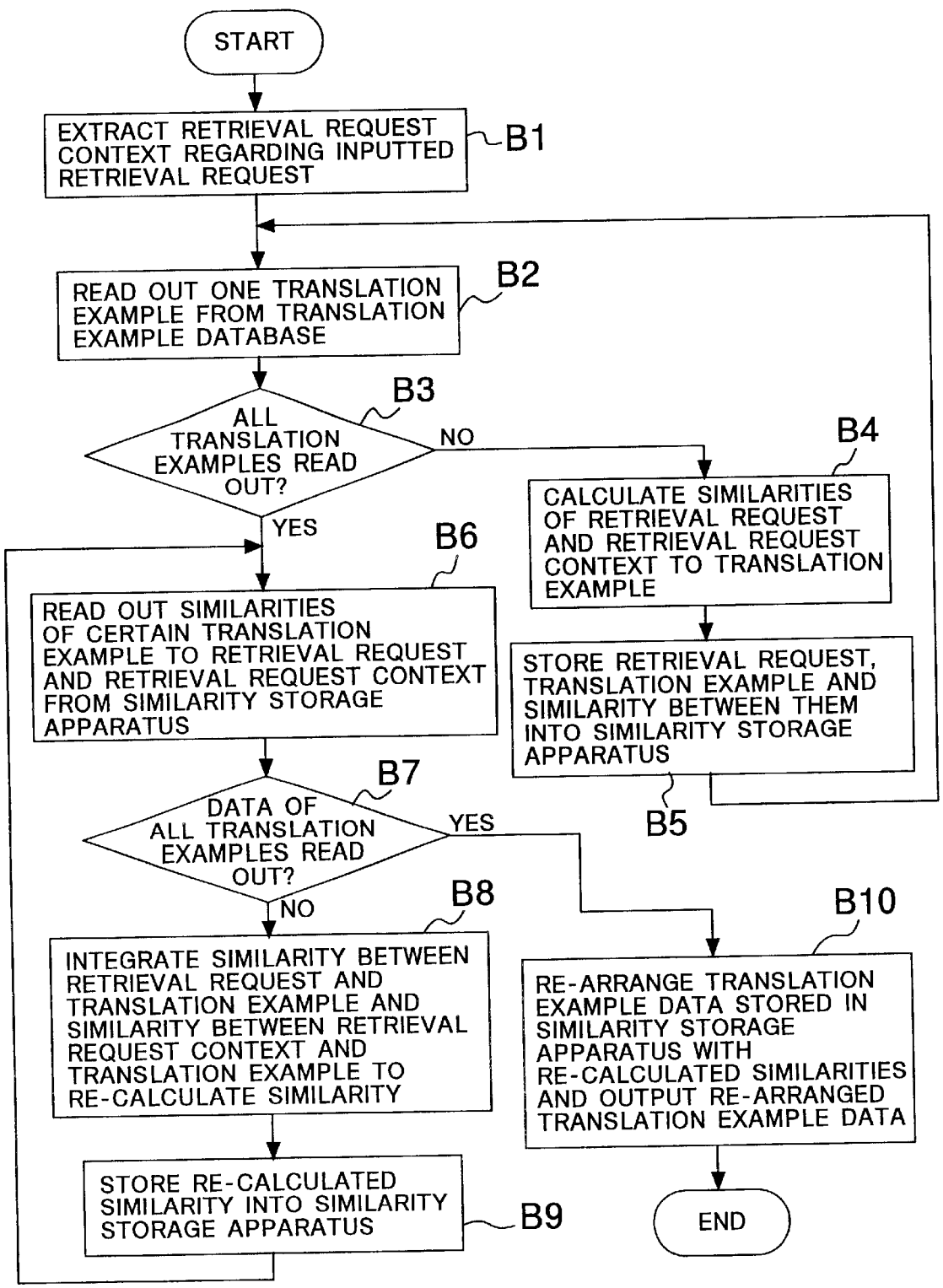
FIG. 10 is a flow chart illustrating operation of the translation supporting apparatus of FIG. 9.

The similarity calculation control section 421 calls the retrieval request context extraction section 422 so that the retrieval request context extraction section 422 extracts a character string which has a predetermined relationship to the retrieval request in the translation target storage apparatus 1 as a retrieval request context (step B1 of FIG. 10). Here, the retrieval request context can be defined as a sentence which appears within the range of one sentence before or after the retrieval request. Alternatively, as a definition of the retrieval request context, a different definition may be employed such as a definition wherein the range before or after the retrieval request is more than one sentence, another definition wherein the range is given as a number of words, a further definition wherein the range is given as the same paragraph or a still further definition wherein the range is given as the same document.

Then, the similarity calculation control section 421 reads in the translation examples one by one from the translation example database 2 by means of the translation example reading section 423 similarly as in the operation of the translation supporting apparatus of FIG. 1 (step B2 of FIG. 10). Thereafter, the similarity calculation control section 421 checks whether or not a translation example has been read in successfully (step B3 of FIG. 10). If a translation example has been read in successfully, then the similarity calculation control section 421 sends the translation example read in by the translation example reading section 423 to the similarity calculation section 424 together with the retrieval request and the retrieval request context so that the similarity calculation section 424 calculates the similarity between the translation example and the retrieval request and the similarity between the translation example and the retrieval request context (step B4 of FIG. 10). The definition of the similarity may be same as that described hereinabove in connection with the operation of the translation supporting apparatus with reference to FIG. 1. If the retrieval request context has been translated already, then a calculation expression may otherwise be used which takes the similarity between the result of translation of the retrieval request context and a character string of a second language in the translation example into consideration.

Then, the similarity calculation control section 421 stores the similarities obtained in step B4 of FIG. 10 into the similarity storage apparatus 425 together with the retrieval request which has been made an object of the calculation, the retrieval request context and the translation example (step B5 of FIG. 10).

By repeating similar processing, the similarity calculation control section 421 calculates the similarities for all of the translation examples stored in the translation example database 2 and stores resulting similarities into the similarity storage apparatus 425.

Thereafter, the similarity calculation control section 421 further re-calculates the similarities of the translation examples taking contexts into consideration. More particularly, the similarity calculation control section 421 first reads out the similarities between a translation example, which is to be used an object of calculation and the translation request and retrieval request context from the similarity storage apparatus 425 (step B6 of FIG. 10). Then, the similarity calculation control section 421 checks whether or not data of all of the translation examples have been read out (step B7 of FIG. 10). If it is detected that there remains some data which has not been processed as yet, then this is sent to the similarity integration section 426 so that the similarity integration section 426 may integrate the pertaining similarities to recalculate the similarity (step B8 of FIG. 10).

The re-calculation of a similarity to a certain translation example can be defined, for example, as a weighted sum of the similarity between a retrieval request and the translation example and the similarity of a retrieval request context and the translation example. Here, the weight on the similarity between the retrieval request context and the translation example is set to a value lower than that of the weight on the similarity between the retrieval request and the translation example. In this instance, however, a constant may be used as the value, or alternatively a function which decreases in accordance with the distance from the retrieval request (character string of a current target of translation) may be used.

The similarity integrated in step B8 of FIG. 10 is stored into the similarity storage apparatus 425 (step B9 of FIG. 10). The similarity calculation control section 421 repeats similar processing to calculate context-inclusive similarities for all of the translation examples and stores the resulting similarities into the similarity storage apparatus 425. Further, the similarity calculation control section 421 refers to the context-inclusive similarities stored in the similarity storage apparatus 425 and outputs those translation examples which are similar to the retrieval request in accordance with the magnitudes of the values of the context-inclusive similarities (step B10 of FIG. 10).

Subsequently, operation of the translation supporting apparatus of FIG. 9 is described more specifically with reference to FIGS. 11 to 14.

FIG. 11 illustrates an example of a translation target stored in the translation target storage apparatus 1. From FIG. 11, it can be seen that two sentences are stored as character strings which make a target of a translation task of a user and the sentence whose sentence ID is 1 is "を受け取りました" ("shorui o uketorimashita") (I received 書類document) while the sentence whose sentence ID is 2 is "すぐに直しておきます" ("Suguni naoshite okimasu") (I'll make a correction immediately). Further, it can be seen that the sentence whose sentence ID is 1 has been translated already by a translation task and also a result of the translation is stored in the translation target storage apparatus 1.

FIG. 12 illustrates an example of contents of the translation example database 2. As described here in above with reference to FIG. 4, in the translation example database 2 illustrated in FIG. 12, each translation example is stored together with a document ID representative of a document and a sentence ID representative of the position of the sentence in the document.

In the following, an example of operation of the translation supporting apparatus of the present embodiment where similar examples are retrieved from within the translation example database of FIG. 12 particularly when the sentence "Sugiini naoshite okimasu" stored in the translation target storage apparatus 1 of FIG. 11 is inputted as a retrieval request is described.

The similarity calculation control section 421 first sends the retrieval request to the retrieval request context extraction section 422 so that it extracts a character string in the translation target storage apparatus 1 which has a predetermined relationship to the retrieval request is extracted as a retrieval request context. Here, if, as a definition of a retrieval request context, for example, a sentence which appears within the range of one sentence before or after the retrieval request is used, for the retrieval request "Suguni naoshite okimasu", the sentence "shorui o uketorimashita" which appears immediately before the retrieval request is obtained as the retrieval request context.

Then, the similarity calculation control section 421 calls the translation example reading section 423 so that it reads in the translation examples one by one from the translation example database 2. Here, a case is considered wherein the sentence of "今晩中にこの書類を直しておいてください" "Konbanju ni kono shorui o naoshite oite kudasai") (Please make a correction on this document in this evening) indicated in FIG. 12 is read in first.

Thereafter, the similarity calculation control section 421 sends the retrieval request, the retrieval request context and the translation example read in to the similarity calculation section 424 so that it calculates similarities between the retrieval request and retrieval request context and the translation example. Here, the similarities can be calculated using, for example, the calculation expression described hereinabove in connection with the operation of the translation supporting apparatus of FIG. 1. Here, the retrieval request "Suguni naoshite okimasu" includes two independent words "すぐに" ("suguni") and "直す" ("naosu"), and the translation example "Konbanju ni kono shorui o naoshite oite kudasai" includes three. independent words of "今晩" ("konban"), "書類" ("shorui") and "直す" ("naosu"). Since the one word "直す" ("naosu") is an independent word common to the retrieval request and the translation example, the similarity can be calculated as 2×1/(2+3)=0.4.

The similarity calculation control section 421 repeats similar processing to calculate similarities of all of the translation examples in the translation example database 2 and stores results of the calculation into the similarity calculation section 424. The results of the calculation are illustrated in the column of the similarity between one sentence and one sentence of the table shown in FIG. 13.

Thereafter, the similarity calculation control section 421 further re-calculates the similarity of each translation example taking a context into consideration. In particular, the similarity calculation control section 421 reads out the similarity between the retrieval request and a translation example and the similarity between the retrieval request context and the translation example from the similarity storage apparatus 425 and sends them to the similarity integration section 426 so that the similarity integration section 426 may integrate the similarities to re-calculate the similarity. Re-calculation of the similarity to a certain translation example can be defined, for example, by such a calculation expression as given below:

1) when the similarity between the retrieval request and the translation example is 0,
   0

2) when the similarity is any other than 1) above, $$(\text{similarity between retrieval request and translation example})+0.7 \\ (\text{similarity between retrieval request context and translation example})$$

Where the calculation expression above is used, the context-inclusive similarity to the translation example "Konbanju ni kono shorui o naoshite oite kudasai"is 0.4+0.7×0.4=0.68. The similarity integrated here is stored into the similarity storage apparatus 425 again.

The similarity calculation control section 421 repeats similar processing to calculate the similarities to all of the translation examples to calculate the context-inclusive similarities and stores results of the calculation into the similarity storage apparatus 425. FIG. 13 illustrates an example of data stored in the similarity storage apparatus 425 after the similarities are re-calculated.

Further, the similarity calculation control section 421 refers to the context-inclusive similarities stored in the similarity storage apparatus 425 and outputs those translation examples which are similar to the retrieval request in the descending order of the magnitudes of the values of the similarities. An example of the output is illustrated in FIG. 14.

Referring to FIG. 13, two translation examples which are inappropriate in regard to the similarity between one sentence and one sentence exhibit higher similarities than the translation example which is appropriate in regard to the similarity between one sentence and one sentence, and an appropriate translation example cannot be selected. However, according to FIG. 14, it can be seen that, for the retrieval request of "Suguni naoshite okimasu", the translation example of "Konbanju ni kono shorui o naoshite oite kudasai"—"Please make a correction on this document in this evening" in which the word "直す" ("naosu") is translated appropriately in the meaning of "correct (an error or the like)" is outputted at the top.

Figure 15:
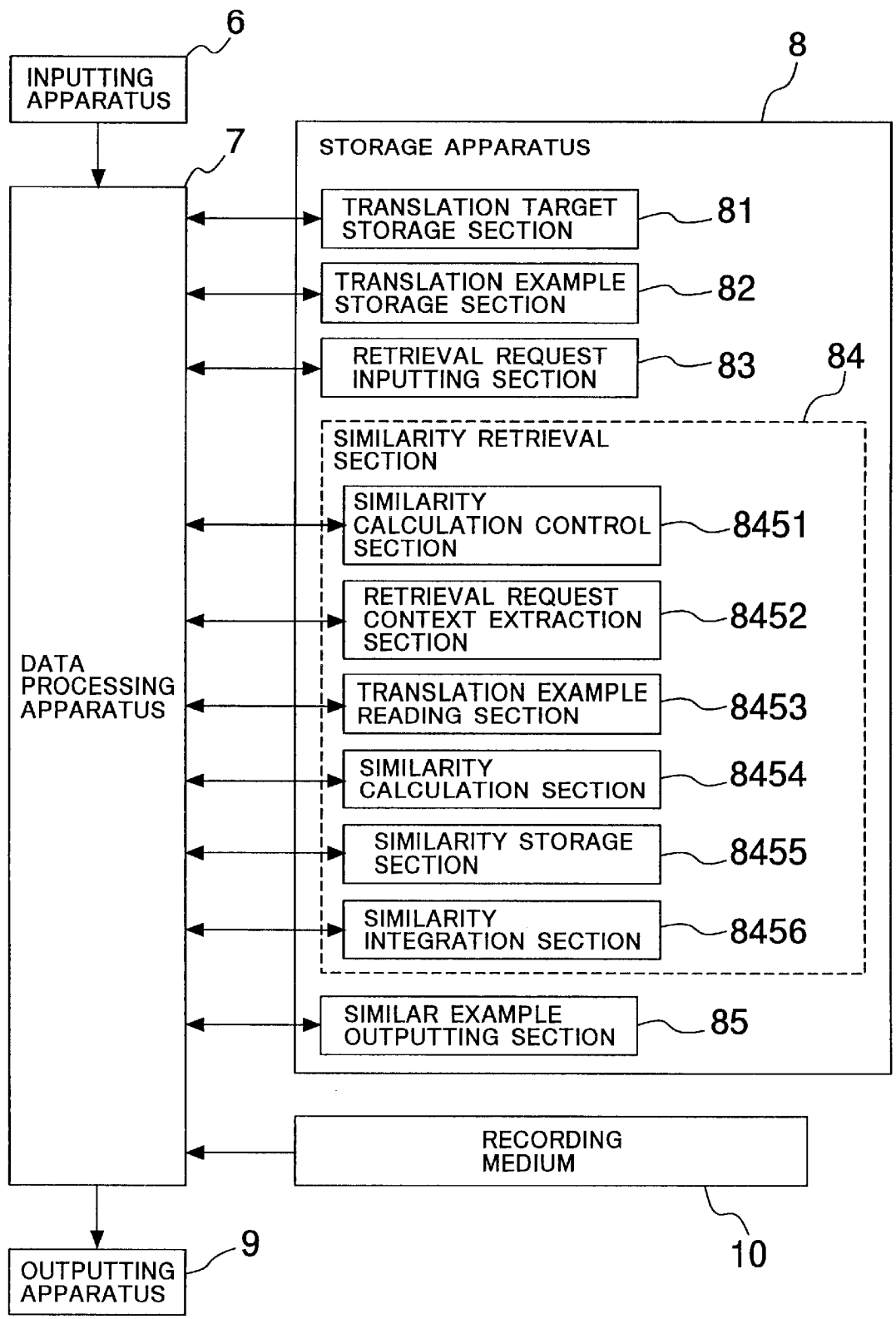
FIG. 15 is a block diagram of a still further translation supporting apparatus to which the present invention is applied.

FIG. 15 is a block diagram showing a still further translation supporting apparatus to which the present invention is applied. Referring to FIG. 15, the translation supporting apparatus shown includes an inputting apparatus 6, a data processing apparatus 7, a storage apparatus 8, an outputting apparatus 9 and a recording medium 10 on which a translation supporting program is recorded, similarly to the translation supporting apparatus described hereinabove with reference to FIG. 8.

The translation supporting program is read into the data processing apparatus 7 from the recording medium 10, and, when necessary, it is partly placed into the storage apparatus 8 and used to control operation of the data processing apparatus 7 so that such storage sections as a translation target storage section 81, a translation example storage section 82 and a similarity storage section 8455 of a similarity retrieval section 84 are implemented and such functioning sections as a retrieval request inputting section 83, a similar example outputting section 85, and a similarity calculation control section 8451, a retrieval request context extraction section 8452, a translation example reading section 8453, a similarity calculation section 8454 and a similarity integration section 8456 of the similarity retrieval section 84 are implemented on the computer. Here, as a relationship to the translation supporting apparatus described hereinabove with reference to FIG. 9, the translation target storage section 81 corresponds to the translation target storage apparatus 1; the translation example storage section 82 to the translation example database 2; the retrieval request inputting section 83 to the retrieval request inputting apparatus 3; the components of the similarity retrieval section 84 correspond to the components of the similarity retrieval apparatus 4; and the similar example outputting section 85 corresponds to the similar example outputting apparatus 5. The translation supporting apparatus of the present embodiment is characterized in that the data processing apparatus 7 operates under the control of the translation supporting program and has basic functions same as those of the translation supporting apparatus of FIG. 9. In other words, the data processing apparatus 7 executes the following processing under the control of the translation supporting program.

In response to an input from the inputting apparatus 6, the retrieval request inputting section 83 reads out a character string which is to be used a retrieval request from the translation target storage section 81 and starts up the similarity calculation control section 8451 to execute similarity retrieval processing.

When the similarity calculation control section 8451 accepts the retrieval request, it first starts up the retrieval request context extraction section 8452 and delivers the retrieval request to the retrieval request context extraction section 8452. The retrieval request context extraction section 8452 receives the retrieval request, extracts a character string which has a predetermined relationship to the retrieval request in the translation target storage section 81 as a retrieval request context of the retrieval request and returns the retrieval request context to the similarity calculation control section 8451.

The similarity calculation control section 8451 accepts the retrieval request context and starts up the translation example reading section 8453. The translation example reading section 8453 reads out translation examples one by one from the translation example storage section 82 and successively returns them to the similarity calculation control section 8451.

When the similarity calculation control section 8451 receives a translation example from the translation example reading section 8453, it starts up the similarity calculation section 8454 and delivers a combination of the retrieval request and the received translation example and another combination of the retrieval request context and the received translation example to the similarity calculation section 8454. The similarity calculation section 8454 receives the retrieval request and the translation example or the retrieval request context and the received translation example, calculates the similarity between them and returns the calculation result of the similarity to the similarity calculation control section 8451.

The similarity calculation control section 8451 receives the calculation result of the similarity, from the similarity calculation section 8454, and stores the retrieval request or retrieval request context and the translation example which has been the object of the calculation in a coordinated relationship into the similarity storage section 8455. Thereafter, the similarity calculation control section 8451 repeats, for all of the translation examples stored in the translation example storage section 82, calculation of the similarity and storage of the calculated similarity into the similarity storage section 8455.

After the similarity calculation for all of the translation examples stored in the translation example storage section 82 is completed, the similarity calculation control section 8451 reads in similarities between a translation example which is to be used as an object of re-calculation and the retrieval request and retrieval request context from the similarity storage section 8455, and starts up the similarity integration section 8456 and sends the similarities between the translation example, which is to be used as the object of re-calculation, and the retrieval request and retrieval request context obtained from the similarity storage section 8455 to the similarity integration section 8456. The similarity integration section 8456 integrates the similarities received from the similarity calculation control section 8451 to re-calculate the similarity between the. retrieval request and the translation example and returns the resulting similarity to the similarity calculation control section 8451.

The similarity calculation control section 8451 receives the re-calculation result of the similarity from the similarity integration section 8456 and stores it into the similarity storage section 8455. Thereafter, the similarity calculation control section 8451 repeats, for all of the combinations of the translation request and the translation examples stored in the similarity storage section 8455, the processing of re-calculating the similarity and storing a result of the re-calculation into the similarity storage section 8455.

After the re-calculation of the similarity for all of the translation examples stored in the similarity storage section 8455 is completed, the similarity calculation control section 8451 starts up the similar example outputting section 85. The similar example outputting section 85 orders the translation examples stored in the similarity storage section 8455 based on the similarities of the results of the re-calculation and outputs them in the order to the outputting apparatus 9.

Figure 16:
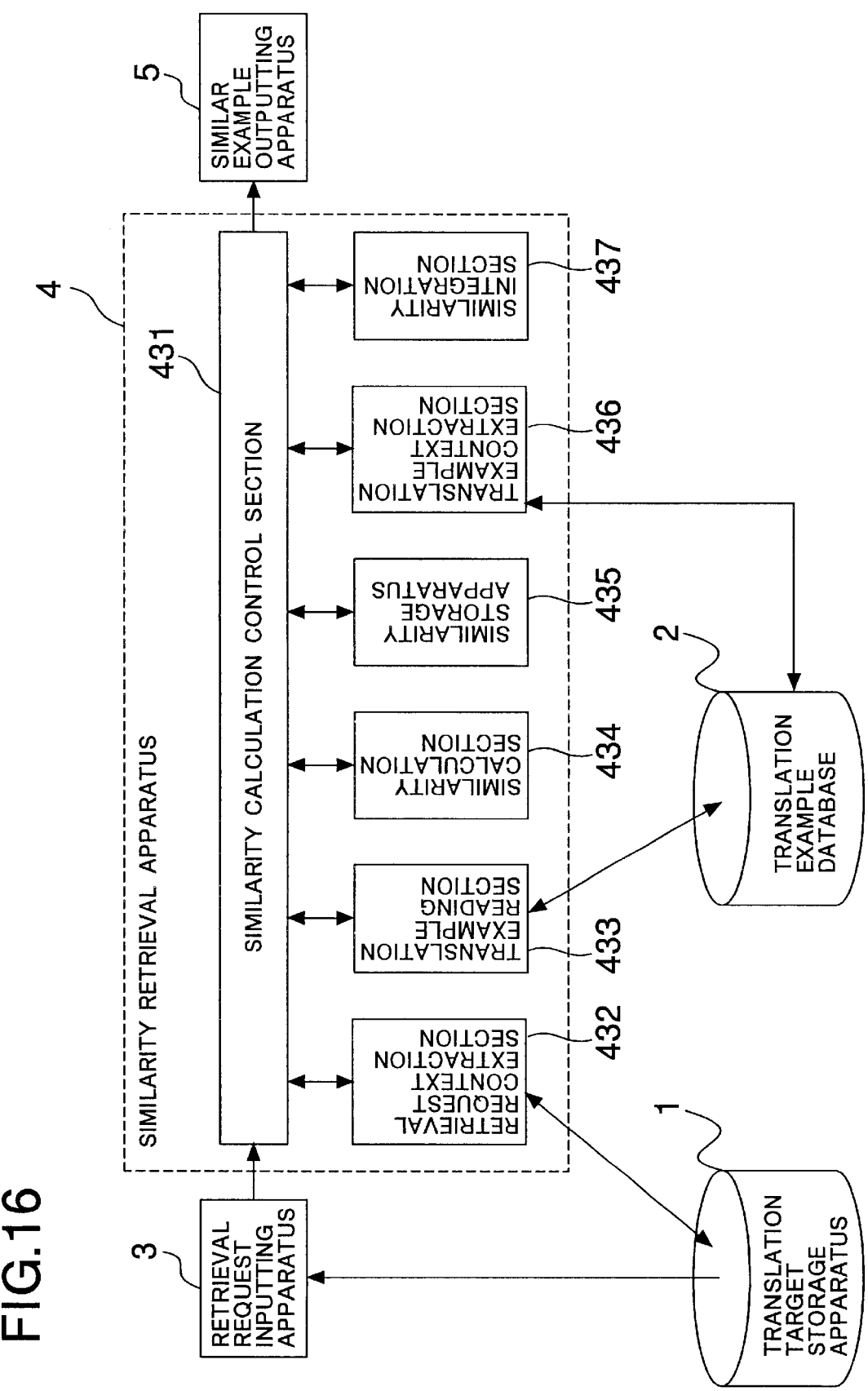
FIG. 16 is a block diagram of a yet further translation supporting apparatus to which the present invention is applied.

FIG. 16 shows a yet further translation supporting apparatus to which the present invention is applied. The present translation supporting apparatus takes a context composed of a sentence around each translation example and a context composed of a sentence around a character string which to be used as a target of translation into consideration to determine a translation example similar to the character string.

Referring to FIG. 16, the translation supporting apparatus shown is a modification to but is different from the translation supporting apparatus described hereinabove with reference to FIG. 1 only in the internal construction of the similarity retrieval apparatus 4. In particular, the similarity retrieval apparatus 4 of the present translation supporting apparatus includes a similarity calculation control section 431 for controlling entire similarity calculation, a retrieval request context extraction section 432 for extracting a character string of a first language which has a predetermined relationship to a retrieval request inputted from the retrieval request inputting apparatus 3 as a retrieval request context from within a translation target stored in the translation target storage apparatus 1, a translation example reading section 433 for reading out the translation examples one by one from the translation example database 2, a similarity calculation section 434 for comparing the retrieval request inputted from the retrieval request inputting apparatus 3 and the retrieval request context extracted by the retrieval request context extraction section 432 with one translation example read in by the translation example reading section 433 to calculate similarities between them, a similarity storage apparatus 435 for storing the similarities calculated by the similarity calculation section 434 for a combination of the retrieval request inputted from the retrieval request inputting apparatus 3 and the retrieval request context extracted by the retrieval request context extraction section 432 with each of the translation examples stored in the translation example database 2 together with the combination, a translation example context extraction section 436 for extracting a translation example which has a predetermined relationship to a certain translation example in the translation example database 2 as a translation example context of the certain translation example, and a similarity integration section 437 for referring to the similarities stored in the similarity storage apparatus 435 to integrate the similarity between the retrieval request and the translation example, the similarity between the retrieval request and the translation example context, the similarity between the retrieval request context and the, translation example and the similarity between the retrieval request context and the translation example context to calculate the similarity of each of the translation examples.

Now, operation of the translation supporting apparatus of FIG. 16 is described with reference to the block diagram of FIG. 16 and the flow chart of FIG. 17.

If a retrieval request is received, then the similarity retrieval apparatus 4 executes similarity calculation under the control of the similarity calculation control section 431 and outputs a translation example similar to the retrieval request.

The similarity calculation control section 431 first calls the retrieval request context extraction section 432 so that the retrieval request context extraction section 432 extracts a character string in the translation target storage apparatus 1 which has a predetermined relationship to the retrieval request as a retrieval request context (step C1 of FIG. 17) similarly as in the operation of the translation supporting apparatus described hereinabove with reference to FIG. 10. Then, the similarity calculation control section 431 calls the translation example reading section 433 so that the translation example reading section 433 reads in the translation examples one by one from the translation example database 2 similarly as in the operation of the translation supporting apparatus of FIG. 1 (step C2 of FIG. 17). Thereafter, the similarity calculation control section 431 checks whether or not a translation example has been read in successfully (step C3 of FIG. 17). If a translation example has been read in successfully, then the similarity calculation control section 431 sends the translation example read in by the translation example reading section 433 to the similarity calculation section 434 together with the retrieval request and the retrieval request context so that the similarity calculation section 434 calculates the similarity between the translation example and the retrieval request and the similarity between the translation example and the retrieval request context (step C4 of FIG. 17). The calculation of the similarities can be performed by the same method as that used in the translation supporting apparatus of the embodiments described above.

Figure 17:
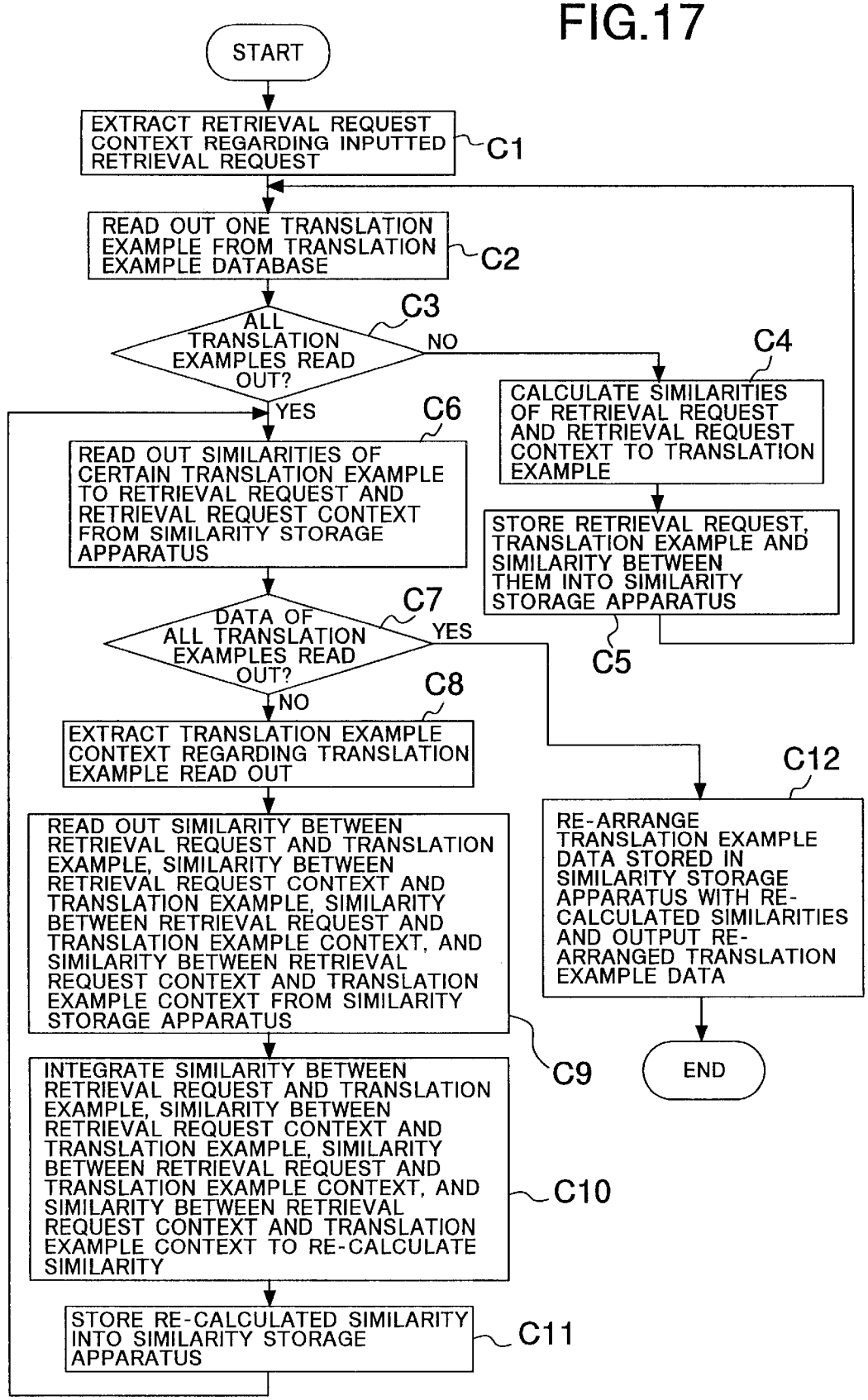
FIG. 17 is a flow chart illustrating operation of the translation supporting apparatus of FIG. 16.

Then, the similarity calculation control section 431 stores the similarities obtained in step C4 of FIG. 17 into the similarity storage apparatus 435 together with the retrieval request which has been made an object of the calculation, the retrieval request context and the translation example (step C5 of FIG. 17). Further, by repeating similar processing, the similarity calculation control section 431 calculates the similarities for all of the translation examples stored in the translation example database 2 and stores the resulting similarities into the similarity storage apparatus 435.

Thereafter, the similarity calculation control section 431 further re-calculates the similarities of the translation examples taking contexts into consideration. More particularly, the similarity calculation control section 431 first reads out the similarities between a translation example which makes an object of calculation and the translation request and retrieval request context from the similarity storage apparatus 435 (step C6 of FIG. 17). Then, the similarity calculation control section 431 checks whether or not data of all of the translation examples have been read out (step C7 of FIG. 17). If it is discriminated that some data which has not been processed as yet remains, then the translation example is read .out and sent to the translation example context extraction section 436 so that the translation example context extraction section 436 may extract a translation example in the translation example database 2 which has a predetermined relationship to the translation example as a translation example context (step C8 of FIG. 17).

Then, the similarity calculation control section 431 reads out the similarity between the retrieval request and the translation example, the similarity between the retrieval request context and the translation example, the similarity between the retrieval request and the translation example context and the similarity between the retrieval request context and the translation example context from the similarity storage apparatus 435 (step C9 of FIG. 17). Further, the similarity calculation control section 431 sends the thus read out similarities to the similarity integration section 437 so that the similarity integration section 437 may integrate the similarities to re-calculate the similarity (step C10 of FIG. 17).

The re-calculation of a similarity to a certain translation example can be defined, for example, as a weighted sum of the similarity between the retrieval request and the translation example, the similarity between the retrieval request context and the translation example, the similarity between the retrieval request and the translation example context and the similarity between the retrieval request context and the translation example context. Here, the weights on the similarity between the retrieval request context and the translation example, the similarity between the retrieval request and the translation example context and the similarity between the retrieval request context and the translation example context are set to values lower than that of the weight on the similarity between the retrieval request and the translation example. In this instance, however, constants maybe used as the values, or alternatively a function which decreases in accordance with the distance from the retrieval request (character string of a current translation target) may be used for the weight on the similarity between the retrieval request context and the translation example; a function which decreases in accordance with the distance from the translation example may be used for the weight on the similarity between the retrieval request and the translation example context: and a function which decreases in accordance with the distances from the retrieval request and the translation example may be used for the weight on the similarity between the retrieval request context and the translation example context.

The similarity integrated in step C10 of FIG. 17 is stored into the similarity storage apparatus 435 (step C11 of FIG. 17). The similarity calculation control section 431 repeats similar processing to calculate context-inclusive similarities for all of the translation examples and stores the resulting similarities into the similarity storage apparatus 435. Further, the similarity calculation control section 431 refers to the context-inclusive similarities stored in the similarity storage apparatus 435 and outputs those translation examples which are similar to the retrieval request in accordance with the magnitudes of the values of the context-inclusive similarities (step C12 of FIG. 12).

Now, an example of operation of the translation supporting apparatus of FIG. 16 is described in detail with reference to FIGS. 4, 11, 18 and 20.

Here, an operation of the translation supporting apparatus particularly where a similar example is retrieved from the translation example database 2 of FIG. 4 when the sentence "Suguni naoshite okimasu" stored in the translation target storage apparatus 1 of FIG. 11 is inputted as a retrieval request is described below.

Upon reception of a retrieval request, the similarity retrieval apparatus 4 executes similarity calculation under the control of the similarity calculation control section 431 and outputs translation examples similar to the retrieval request.

The similarity calculation control section 431 first calls the retrieval request context extraction section 432 so that the retrieval request context extraction section 432 may output a character string which has a predetermined relationship to the retrieval request in the translation target storage apparatus 1 as a retrieval request context. Here, if the same definition as that described hereinabove in connection with the operation of the translation supporting apparatus of FIG. 9 or 15 is used as a definition of the retrieval request context, then the sentence "shorui o uketorimashita" can be obtained as the retrieval request context for the retrieval request "Suguni naoshite okimasu".

The similarity calculation control section 431 calls the translation example reading section 433 so that the translation examples are read in one by one from the translation example database 2 in a similar manner as in the operation described hereinabove in connection with the translation supporting apparatus of FIG. 1 or 9. Further, a translation example thus read in is sent to the similarity calculation section 434 together with the retrieval request and the retrieval request context so that similarities between the translation example and the retrieval request and retrieval request context are calculated. The similarities can be calculated using a calculation expression same as that used in the description of the operation of the translation supporting apparatus of the embodiments described hereinabove. The similarities obtained here are stored into the similarity storage apparatus 435 together with the retrieval request context and the translation example which have been the object of the calculation.

The similarity calculation control section 431 repeats similar processing to calculate similarities for all of the translation examples in the translation example database 2 and stores the resulting similarities into the similarity storage apparatus 435. The results of the calculation are illustrated in the column of the similarity between one sentence and one sentence of the table shown in FIG. 18.

Thereafter, the similarity calculation control section 431 re-calculates the similarities for all translation examples taking respective contexts into consideration. In particular, similarly as in the operation described hereinabove in connection with the translation supporting apparatus of FIG. 1 or 9, the similarity calculation control section 431 first sends a translation example which makes an object of calculation to the translation example context extraction section 436 so that another translation example which has a predetermined relationship to the translation example is extracted as a translation example context from within the translation example database 2. Here, if a definition similar to that described hereinabove in connection with the translation supporting apparatus of FIG. 1 or 9 is used as a definition for the translation example context, then, for the translation example "Rei no shorui desu ga, ikutsuka machigai ga arimashita" illustrated in FIG. 4, the translation example "Konbanju ni naoshite oite kudasai" which appears directly following the translation example is obtained as a translation example context.

Then, the similarity calculation control section 431 reads out the similarity between the retrieval request and the translation example, the similarity between the retrieval request context and the translation example, the similarity between the retrieval request and the translation example context and the similarity between the retrieval request context and the translation example context from the similarity storage apparatus 435 and sends the thus read out similarities to the translation example context extraction section 436 so that the translation example context extraction section 436 may integrate the similarities to re-calculate the similarity. Re-calculation of the similarity to a certain translation example can be defined, for example, by such a calculation expression as given below:

1) when the similarity between the retrieval request and the translation example is 0,

0

2) when the similarity is any other than 1) above, (similarity between retrieval request and translation example)+
0.7×(similarity between retrieval request context and translation example)+0.7×(similarity between retrieval request and translation example context)+0.7×(similarity between retrieval request context and translation example context)

Where the calculation expression above is used, the context-inclusive similarity to the translation example "Rei no shorui desu ga, ikutsuka machigai ga arimashita" is 0.5+0.7×0+0.7×0+0.7×0.33=0.75.

The similarity integrated here is stored into the similarity storage apparatus 435. The similarity calculation control section 431 repeats similar processing to calculate the similarities to all of the translation examples and stores results of the calculation into the similarity storage apparatus 435. FIG. 18 illustrates an example of data stored in the similarity storage apparatus 435 after the similarities are integrated. Further, the similarity calculation control section 431 refers to the context-inclusive similarities stored in the similarity storage apparatus 435 and outputs those translation examples which are similar to the retrieval request in accordance with the magnitudes of the values of the similarities.

Referring to FIG. 18, three translation examples have an equal score of 0.5 in regard to the similarity between one sentence and one sentence, and an appropriate translation example cannot be selected. However, according to FIG. 19, it can be seen that, for the retrieval request of "Suguni naoshite okimasu" in the context of "書類" ("shorui"), the translation example of "Konbanju ni naoshite oite kudasai"—"Please make a correction on it in this evening" in which the word "直す" ("naosu") is translated appropriately in the meaning of "correct (an error or the like)" is outputted at the top.

Figure 20:
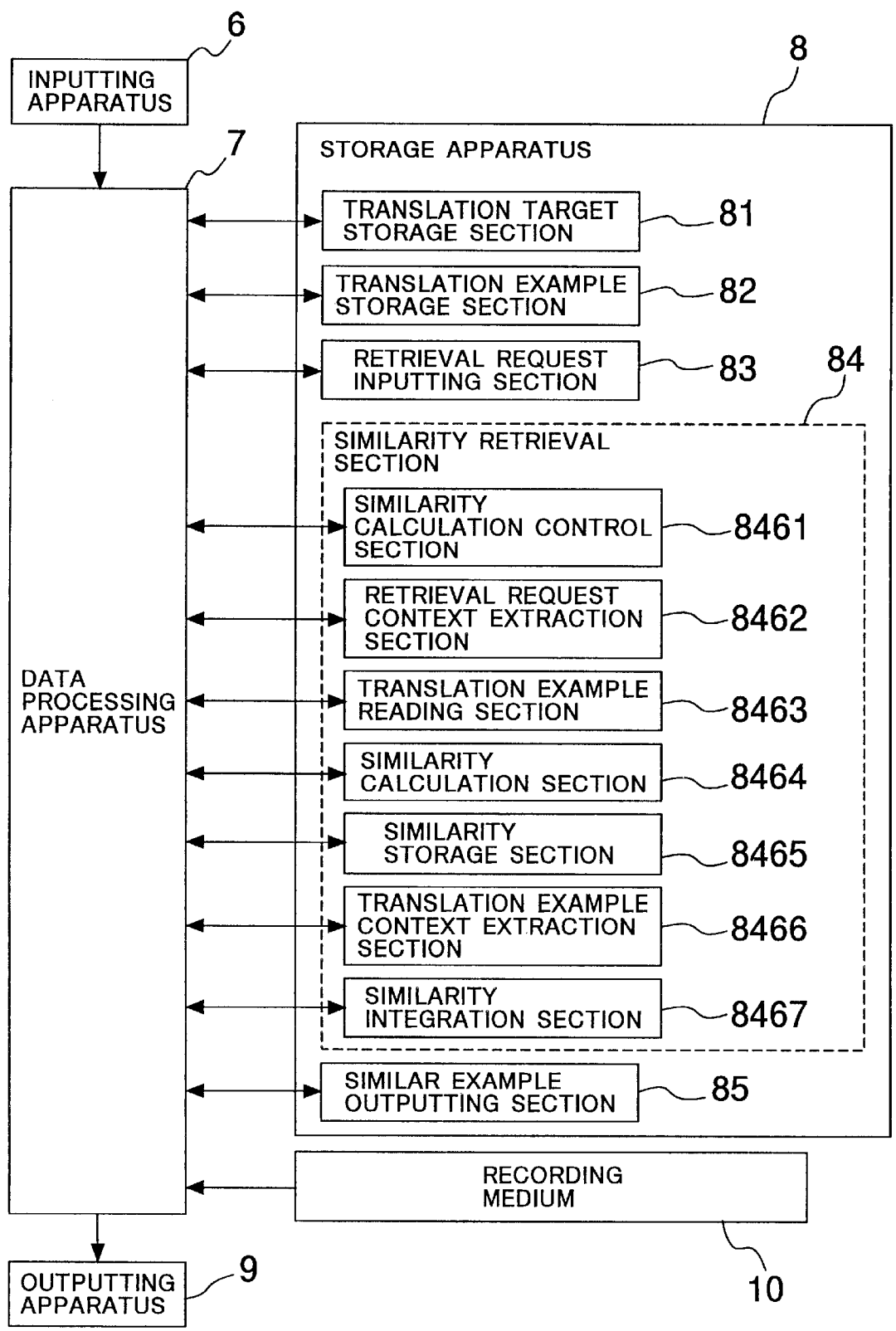
FIG. 20 is a block diagram of a yet further translation supporting apparatus to which the present invention is applied.

FIG. 20 is a block diagram showing a yet further translation supporting apparatus to which the present invention is applied. Referring to FIG. 20, the translation supporting apparatus shown includes an inputting apparatus 6, a data processing apparatus 7, a storage apparatus 8, an outputting apparatus 9 and a recording medium 10 on which a translation supporting program is recorded, similarly to the translation supporting apparatus described hereinabove with reference to FIG. 8 or 15.

The translation supporting program is read into the data processing apparatus 7.from the recording medium 10, and, when necessary, it is partly placed into the storage apparatus 8 and used to control operation of the data processing apparatus 7 so that such storage sections as a translation target storage section 81, a translation example storage section 82 and a similarity storage section 8465 of a similarity retrieval section 84 are implemented and such functioning sections as a retrieval request inputting section 83, a similar example outputting section 85, and a similarity calculation control section 8461, a retrieval request context extraction section 8462, a translation example reading section 8463, a similarity calculation section 8464, a translation example context extraction section 8466 and a similarity integration section 8467 of the similarity retrieval section 84 are implemented on the computer. Here, as a relationship to the translation supporting apparatus described hereinabove with reference to FIG. 16, the translation target storage section 81 corresponds to the translation target storage apparatus 1; the translation example storage section 82 to the translation example database 2; the retrieval request inputting section 83 to the retrieval request inputting apparatus 3; the components of the similarity retrieval section 84 correspond to the components of the similarity retrieval apparatus 4; and the similar example outputting section 85 corresponds to the similar example outputting apparatus 5. The translation supporting apparatus of the present embodiment is characterized in that the data processing apparatus 7 operates under the control of the translation supporting program and has basic functions same as those of the translation supporting apparatus of FIG. 16. In particular, the data processing apparatus 7 executes the following processing under the control of the translation supporting program.

In response to an input from the inputting apparatus 6, the retrieval request inputting section 83 reads out a character string which makes a retrieval request from the translation target storage section 81 and starts up the similarity calculation control section 8461 to execute similarity retrieval processing.

When the similarity calculation control section 8461 accepts a retrieval request, it first starts up the retrieval request context extraction section 8462 and delivers the retrieval request to the retrieval request context extraction section 8462. The retrieval request context extraction section 8462 receives the retrieval request, extracts a character string which has a predetermined relationship to the retrieval request in the translation target storage section 81 as a retrieval request context of the retrieval request and returns the retrieval request context to the similarity calculation control section 8461.

The similarity calculation control section 8461 accepts the retrieval request context and starts up the translation example reading section 8463. The translation example reading section 8463 reads out translation examples one by one from the translation example storage section 82 and returns them to the similarity calculation control section 8461.

When the similarity calculation control section 8461 receives a translation example from the translation example reading section 8463, it starts up the similarity calculation section 8464 and delivers a combination of the retrieval request and the received translation example and another combination of the retrieval request context and the received translation example to the similarity calculation section 8464. The similarity calculation section 8464 receives the retrieval request and the translation example or the retrieval request context and the translation example, calculates the similarity between them and returns the calculation result of the similarity to the similarity calculation control section 8461.

The similarity calculation control section 8461 receives the calculation result of the similarity from the similarity calculation section 8464, and stores the retrieval request or retrieval request context and the translation example which has been the object of the calculation in a coordinated relationship into the similarity storage section 8465. Thereafter, the similarity calculation control section 8461 repeats, for all of the translation examples stored in the translation example storage section 82, calculation of the similarity and storage of the calculated similarity into the similarity storage section 8465.

After the similarity calculation for all of the translation examples stored in the translation example storage section 82 is completed, the similarity calculation control section 8461 reads in similarities between a translation example which is to make an object of re-calculation and the retrieval request and retrieval request context from the similarity storage section 8465. Then, the similarity calculation control section 8461 starts up the translation example context extraction section 8466 and delivers the translation example, which has been read in as an object of calculation, to the translation example context extraction section 8466. The translation example context extraction section 8466 receives the translation example, extracts a translation example which has a predetermined relationship to the received translation example as a translation example context of the translation example from within the translation example storage section 82 and returns the translation example context to the similarity calculation control section 8461.

The similarity calculation control section 8461 receives the translation example context, reads in the similarity between the retrieval request and the translation example context and the similarity between the retrieval request context and the translation example context from the similarity storage section 8465. Then, the similarity calculation control section 8461 starts up the similarity integration section 8467 and sends the similarities between the translation example and the retrieval request and retrieval request context and the similarities between the translation example context corresponding to the translation example and the retrieval request and retrieval request context received from the similarity storage section 8465 and making an object of re-calculation to the similarity integration section 8467. The similarity integration section 8467 integrates the received similarities to re-calculate the similarity between the retrieval request and the translation example and returns a result of the similarity re-calculation to the similarity calculation control section 8461.

The similarity calculation control section 8461 receives the re-calculation result of the similarity from the similarity integration section 8467 and stores it into the similarity storage section 8465. Thereafter, the similarity calculation control section 8461 repeats, for all of the combinations of the retrieval requests and the translation examples stored in the similarity storage section 8465, the processing of re-calculating the similarity and storing a result of the re-calculation into the similarity storage section 8465.

After the re-calculation of the similarities for all of the translation examples stored in the similarity storage section 8465 is completed, the similarity calculation control section 8461 starts up the similar example outputting section 85. The similar example outputting section 85 orders the translation examples stored in the similarity storage section 8465 based on the similarities of the results of the re-calculation and outputs them in the order to the outputting apparatus 9.

While preferred embodiment of the present invention have been described using specific terms; such description is for illustrative purposes only, and it is to be understood that changes and variations may be made without departing from the spirit or scope of the following claims.

What is claimed is:

1. A translation supporting apparatus for retrieving and outputting a translation example of a second language similar to a character string of a first language which is a translation target, comprising:

translation example storage means in which a plurality of character strings of the first language and a plurality of translation examples composed of results of translation of the second language from the character string are stored;

similarity determination means for determining, for each of the translation examples, a similarity between the translation example and a retrieval request which is a translation target character string and a similarity between the retrieval request and a translation example context which is another translation example having a predetermined relationship to the translation example and integrating the similarities to determine an integrated similarity;

similarity storage means for storing the integrated similarities determined by said similarity determination means for the individual translation examples; and outputting means for referring to the integrated similarities stored in said similarity storage means and outputting a translation example similar to the retrieval request.

2. A translation supporting apparatus as claimed in claim 1, wherein said similarity determination means sets, for each of the translation examples, a translation example which is another translation example which belongs to the same document as the translation example and whose distance from the translation example in the document is within a predetermined range as the translation example context.

3. A translation supporting apparatus as claimed in claim 2, wherein said similarity determination means determines, for each of the translation examples, the integrated similarity as a weighted sum of the similarity between the translation example and the retrieval request and the similarity between the translation example context and the retrieval request.

4. A translation supporting apparatus as claimed in claim 3, wherein the weight on the similarity between the translation example context and the retrieval request is smaller than the weight on the similarity between the translation example and the retrieval request.

5. A translation supporting apparatus as claimed in claim 4, wherein the weight on the similarity between the translation example context and the retrieval request decreases as the distance between the translation example context and the translation example in the document increases.

6. A translation supporting apparatus, comprising:

a translation target storage apparatus in which a character string of a first language which is a translation target is stored;

a translation example database in which character strings of the first language and translation examples of a second language corresponding to the character strings are stored for each document;

retrieval request inputting means for accepting the character string of the first language stored in said translation target storage apparatus as a retrieval request;

similarity retrieval means for retrieving a translation example corresponding to a character string similar to the retrieval request inputted by said retrieval request inputting means from within said translation example database; and similar example outputting means for outputting the similar example retrieved by said similarity retrieval means;

said similarity retrieval means including similarity calculation control means for controlling entire similarity calculation, translation example reading means for reading out the translation examples one by one from said translation example database, similarity calculation means for comparing the retrieval request inputted by said retrieval request inputting means and the translation example read in by said translation example reading means with each other to calculate a similarity, a similarity storage apparatus for storing, for each of combinations of the retrieval request inputted by said retrieval request inputting means and the translation examples in said translation example database, the similarity calculated by said similarity calculation means together with the combination, translation example context extraction means for extracting a translation example which has a predetermined relationship to a certain translation example in said translation example database as a translation example context of the certain translation example, and similarity integration means for referring to the similarities stored in said similarity storage means and integrating the similarities between the retrieval request and the translation examples and the similarities between the retrieval request and the translation example contexts to calculate the similarities to the translation examples.

7. A translation supporting apparatus for retrieving and outputting a translation example of a second language similar to a character string of a first language which is a translation target, comprising:

translation example storage means in which a plurality of character strings of the first language and a plurality of translation examples composed of results of translation of the second language from the character string are stored;

similarity determination means for determining, for each of the translation examples, a similarity between the translation example and a retrieval request which is a translation target character string and a similarity between the translation example and a retrieval request context which is another translation target character string having a predetermined relationship to the retrieval request and integrating the similarities to determine an integrated similarity;

similarity storage means for storing the integrated similarities determined by said similarity determination means for the individual translation examples; and outputting means for referring to the integrated similarities stored in said similarity storage means and outputting a translation example similar to the retrieval request.

8. A translation supporting apparatus as claimed in claim 7, wherein said similarity determination means sets a translation target character string which is another translation target character string which belongs to the same document as the translation example and whose distance from the retrieval request in the document is within a predetermined range as the retrieval request context.

9. A translation supporting apparatus as claimed in claim 8, wherein said similarity determination means determines, for each of the translation examples, the integrated similarity as a weighted sum of the similarity between the translation example and the retrieval request and the similarity between the translation example and the retrieval request context.

10. A translation supporting apparatus as claimed in claim 9, wherein the weight on the similarity between the translation example and the retrieval request context is smaller than the weight on the similarity between the translation example and the retrieval request.

11. A translation supporting apparatus as claimed in claim 10, wherein the weight on the similarity between the translation example and the retrieval request context decreases as the distance between the retrieval request context and the retrieval request in the document increases.

12. A translation supporting apparatus, comprising:
a translation target storage apparatus in which a character string of a first language which is a translation target is stored;
a translation example database in which character strings of the first language and translation examples of a second language corresponding to the character strings are stored for each document;
retrieval request inputting means for accepting the character string of the first language stored in said translation target storage apparatus as a retrieval request;
similarity retrieval means for retrieving a translation example corresponding to a character string similar to the retrieval request inputted by said retrieval request inputting means from within said translation example database; and
similar example outputting means for outputting the similar example retrieved by said similarity retrieval means;
said similarity retrieval means including similarity calculation control means for controlling entire similarity calculation, retrieval request context extraction means for extracting, from within the translation target stored in said translation target storage apparatus, a character string of the first language which has a predetermined relationship to the retrieval request inputted by said retrieval request inputting means as a retrieval request context, translation example reading means for reading out the translation examples one by one from said translation example database, similarity calculation means for comparing the retrieval request inputted by said retrieval request inputting means and the retrieval request context extracted by said retrieval request context extraction means with the translation example read in by said translation example reading means to calculate similarities therebetween, a similarity storage apparatus for storing, for each of combinations of the retrieval request inputted by said retrieval request inputting means and the retrieval request context extracted by said retrieval request context extraction means with the translation examples in said translation example database, the similarity calculated by said similarity calculation means together with the combination, and similarity integration means for referring to the similarities stored in said similarity storage apparatus and integrating the similarities between the retrieval request and the translation examples and the similarities between the retrieval request contexts and the translation examples to calculate the similarities to the translation examples.

13. A translation supporting apparatus for retrieving and outputting a translation example of a second language similar to a character string of a first language which is a translation target, comprising:
translation example storage means in which a plurality of character strings of the first language and a plurality of translation examples composed of results of translation of the second language from the character string are stored;
similarity determination means for determining, for each of the translation examples, a similarity between the translation example and a retrieval request which is a translation target character string, a similarity between the retrieval request and a translation example context which is another translation example having a predetermined relationship to the translation example, a similarity between the translation example and a retrieval request context which is another translation target character string having a predetermined relationship to the retrieval request and a similarity between the translation example context and the retrieval request context and integrating the similarities to determine an integrated similarity;
similarity storage means for storing the integrated similarities determined by said similarity determination means for the individual translation examples; and
outputting means for referring to the integrated similarities stored in said similarity storage means and outputting a translation example similar to the retrieval request.

14. A translation supporting apparatus as claimed in claim 13, wherein said similarity determination means sets, for each of the translation examples, a translation example which is another translation example which belongs to the same document as the translation example and whose distance from the translation example in the document is within a predetermined range as the translation example context, and sets a translation target character string which is another translation target character string which belongs to the same document as the translation example and whose distance from the retrieval request in the document is within a predetermined range as the retrieval request context.

15. A translation supporting apparatus as claimed in claim 14, wherein said similarity determination means determines, for each of the translation examples, the integrated similarity as a weighted sum of the similarity between the translation example and the retrieval request, the similarity between the translation example context and the retrieval request, the similarity between the translation example and the retrieval request context and the similarity between the translation example context and the retrieval request context.

16. A translation supporting apparatus as claimed in claim 15, wherein the weight on the similarity between the translation example context and the retrieval request, the weight on the similarity between the translation example and the retrieval request context and the weight on the similarity between the translation example context and the retrieval request context are smaller than the weight on the similarity between the translation example and the retrieval request.

17. A translation supporting apparatus as claimed in claim 16, wherein the weight on the similarity between the translation example context and the retrieval request decreases as the distance between the translation example context and the translation example in the document increases; the weight on the similarity between the translation example and the retrieval request context decreases as the distance between the retrieval request context and the retrieval request in the document increases; and the weight on the similarity between the translation example context and the retrieval request context decreases as the distance between the translation example context and the translation example in the document increases and decreases as the weight on the similarity between the retrieval request context and the retrieval request in the document increases.

18. A translation supporting apparatus, comprising:

a translation target storage apparatus in which a character string of a first language which is a translation target is stored;

a translation example database in which character strings of the first language and translation examples of a second language corresponding to the character strings are stored for each document;

retrieval request inputting means for accepting the character string of the first language stored in said translation target storage apparatus as a retrieval request;

similarity retrieval means for retrieving a translation example corresponding to a character string similar to the retrieval request inputted by said retrieval request inputting means from within said translation example database; and similar example outputting means for outputting the similar example retrieved by said similarity retrieval means;

said similarity retrieval means including similarity calculation control means for controlling entire similarity calculation, retrieval request context extraction means for extracting, from within the translation target stored in said translation target storage apparatus, a character string of the first language which has a predetermined relationship to the retrieval request inputted by said retrieval request inputting means as a retrieval request context, translation example reading means for reading out the translation examples one by one from said translation example database, similarity calculation means for comparing the retrieval request inputted by said retrieval request inputting means and the retrieval request context extracted by said retrieval request context extraction means with the translation example read in by said translation example reading means to calculate similarities therebetween, a similarity storage apparatus for storing, for each of combinations of the retrieval request inputted by said retrieval request inputting means and the retrieval request context extracted by said retrieval request context extraction means with the translation examples in said translation example database, the similarity calculated by said similarity calculation means together with the combination, translation example context extraction means for extracting a translation example which has a predetermined relationship to a certain translation example in said translation example database as a translation example context of the certain translation example, and similarity integration means for referring to the similarities stored in said similarity storage means and integrating the similarities between the retrieval request and the translation examples, the similarities between the retrieval request and the translation example contexts, the similarities between the retrieval request context and the translation examples and the similarities between the retrieval request context and the translation example contexts to calculate the similarities to the translation examples.

19. A computer-readable recording medium on which a program is recorded, the program causing a computer to function as a translation target storage section in which a character string of a first language which is a translation target is stored, a translation example storage section in which character strings of the first language and translation examples of a second language corresponding to the character strings are stored for each document, a retrieval request inputting section for accepting the character string of the first language stored in said translation target storage section as a retrieval request, a similarity retrieval section for retrieving a translation example corresponding to a character string similar to the retrieval request inputted by said retrieval request inputting section from within said translation example storage section, and a similar example outputting section for outputting the similar example retrieved by said similarity retrieval section, the program further causing said similarity retrieval section to function as a similarity calculation control section for controlling entire similarity calculation, a translation example reading section for reading out the translation examples one by one from said translation example storage section, a similarity calculation section for comparing the retrieval request inputted by said retrieval request inputting section and the translation example read in by said translation example reading section with each other to calculate a similarity, a similarity storage section for storing, for each of combinations of the retrieval request inputted by said retrieval request inputting section and the translation examples in said translation example storage section, the similarity calculated by said similarity calculation section together with the combination, a translation example context extraction section for extracting a translation example which has a predetermined relationship to a certain translation example in said translation example storage section as a translation example context of the certain translation example, and a similarity integration section for referring to the similarities stored in said similarity storage section and integrating the similarities between the retrieval request and the translation examples and the similarities between the retrieval request and the translation example contexts to calculate the similarities to the translation examples.

20. A computer-readable recording medium on which a program is recorded, the program causing a computer to function as a translation target storage section in which a character string of a first language which is a translation target is stored, a translation example storage section in which character strings of the first language and translation examples of a second language corresponding to the character strings are stored for each document, a retrieval request inputting section for accepting the character string of the first language stored in said translation target storage section as a retrieval request, a similarity retrieval section for retrieving a translation example corresponding to a character string similar to the retrieval request inputted by said retrieval request inputting section from within said translation example section, and a similar example outputting section outputting the similar example retrieved by said similarity retrieval section, the program further causing said similarity retrieval section to function as a similarity calculation control section for controlling entire similarity calculation, a retrieval request context extraction section for extracting, from within the translation target stored in said translation target storage section, a character string of the first language which has a predetermined relationship to the retrieval request inputted by said retrieval request inputting section as a retrieval request context, a translation example reading section for reading out the translation examples one by one from said translation example storage section, a similarity calculation section for comparing the retrieval request inputted by said retrieval request inputting section and the retrieval request context extracted by said retrieval request context extraction section with the translation example read in by said translation example reading section to calculate similarities therebetween, a similarity storage section for storing, for each of combinations of the retrieval request inputted by said retrieval request inputting section and the retrieval request context extracted by said retrieval request context extraction section with the translation examples in said translation example storage section, the similarity calculated by said similarity calculation section together with the combination, and a similarity integration section for referring to the similarities stored in said similarity storage section and integrating the similarities between the retrieval request and the translation examples and the similarities between the retrieval request contexts and the translation examples to calculate the similarities to the translation examples.

21. A computer-readable recording medium on which a program is recorded, the program causing a computer to function as a translation target storage section in which a character string of a first language which is a-translation target is stored, a translation example storage section in which character strings of the first language and translation examples of a second language corresponding to the character strings are stored for each document, a retrieval request inputting section for accepting the character string of the first language stored in said translation target storage section as a retrieval request, a similarity retrieval section for retrieving a translation example corresponding to a character string similar to the retrieval request inputted by said retrieval request inputting section from within said translation example storage section, and a similar example outputting section for outputting the similar example retrieved by said similarity retrieval section, the program further causing said similarity retrieval section to function as a similarity calculation control section for controlling entire similarity calculation, a retrieval request context extraction section for extracting, from within the translation target stored in said translation target storage section, a character string of the first language which has a predetermined relationship to the retrieval request inputted by said retrieval request inputting section as a retrieval request context, a translation example reading section for reading out the translation examples one by one from said translation example storage section, a similarity calculation section for comparing the retrieval request inputted by said retrieval request inputting section and the retrieval request context extracted by said retrieval request context extraction section with the translation example read in by said translation example reading section to calculate similarities therebetween, a similarity storage section for storing, for each of combinations of the retrieval request inputted by said retrieval request inputting section and the retrieval request context extracted by said retrieval request context extraction section with the translation examples in said translation example storage section, the similarity calculated by said similarity calculation section together with the combination, a translation example context extraction section for extracting a translation example which has a predetermined relationship to a certain translation example in said translation example storage section as a translation example context of the certain translation example, and a similarity integration section for referring to the similarities stored in said similarity storage section and integrating the similarities between the retrieval request and the translation examples, the similarities between the retrieval request and the translation example contexts, the similarities between the retrieval request context and the translation examples and the similarities between the retrieval request context and the translation example contexts to calculate the similarities to the translation examples.

22. A translation supporting method for a translation supporting apparatus which includes a translation target storage apparatus in which a character string of a first language which is a translation target is stored and a translation example database in which character strings of the first language and translation examples of a second language corresponding to the character strings are stored for each document, said translation supporting method comprising the steps of:

accepting the character string of the first language stored in said translation target storage apparatus as a retrieval request;

comparing the inputted retrieval request and each of the translation examples in said translation example database with each other to calculate a similarity;

storing the similarity calculated for each of combinations of the inputted retrieval request and the translation examples in said translation example database together with the combination into a similarity storage apparatus;

extracting a translation example which has a predetermined relationship to a certain translation example in said translation example database as a translation example context of the certain translation example;

referring to the similarities stored in said similarity storage apparatus and integrating the similarities between the retrieval request and the translation examples and the similarities between the retrieval request and the translation example contexts to calculate the integrated similarities to the translation examples; and referring to the integrated similarities to output the similar examples.

23. A translation supporting method for a translation supporting apparatus which includes a translation target storage apparatus in which a character string of a first language which is a translation target is stored and a translation example database in which character strings of the first language and translation examples of a second language corresponding to the character strings are stored for each document, said translation supporting method comprising the steps of:

accepting the character string of the first language stored in said translation target storage apparatus as a retrieval request;

extracting, from within the translation target stored in said translation target storage apparatus, a character string of the first language which has a predetermined relationship to the inputted retrieval request as a retrieval request context;

comparing the inputted retrieval request and the retrieval request context extracted for the retrieval request with the translation examples in said translation example database to calculate similarities therebetween;

storing the similarity calculated for each of combinations of the inputted retrieval request and the retrieval request context extracted for the retrieval request with the translation examples in said translation example database together with the combination into a similarity storage apparatus;

referring to the similarities stored in said similarity storage apparatus and integrating the similarities between the retrieval request and the translation examples and the similarities between the retrieval request and the translation example contexts to calculate the integrated similarities to the translation examples; and referring to the integrated similarities to output the similar examples.

24. A translation supporting method for a translation supporting apparatus which includes a translation target storage apparatus in which a character string of a first language which is a translation target is stored and a translation example database in which character strings of the first language and translation examples of a second language corresponding to the character strings are stored for each document, said translation supporting method comprising the steps of:

accepting the character string of the first language stored in said translation target storage apparatus as a retrieval request;

extracting, from within the translation target stored in said translation target storage apparatus, a character string of the first language which has a predetermined relationship to the inputted retrieval request as a retrieval request context;

comparing the inputted retrieval request and the retrieval request context extracted for the retrieval request with the translation examples in said translation example database to calculate similarities therebetween;

storing the similarity calculated for each of combinations of the inputted retrieval request and the retrieval request context extracted for the retrieval request with the translation examples in said translation example database together with the combination into a similarity storage apparatus;

extracting a translation example which has a predetermined relationship to a certain translation example in said translation example database as a translation example context of the certain translation example;

referring to the similarities stored in said similarity storage apparatus and integrating the similarities between the retrieval request and the translation examples, the similarities between the retrieval request and the translation example contexts, the similarities between the retrieval request context and the translation examples and the similarities between the retrieval request context and the translation example contexts to calculate the integrated similarities to the translation examples; and referring to the integrated similarities to output the similar examples.

* * * * *